(12) United States Patent
Pacala

(10) Patent No.: US 11,624,835 B2
(45) Date of Patent: Apr. 11, 2023

(54) PROCESSING OF LIDAR IMAGES

(71) Applicant: Ouster, Inc., San Francisco, CA (US)

(72) Inventor: Angus Pacala, San Francisco, CA (US)

(73) Assignee: Ouster, Inc., San Francisco, CA (US)

(*) Notice: Subject to any disclaimer, the term of this patent is extended or adjusted under 35 U.S.C. 154(b) by 0 days.

(21) Appl. No.: 17/599,805

(22) PCT Filed: Sep. 8, 2020

(86) PCT No.: PCT/US2020/049770
§ 371 (c)(1),
(2) Date: Sep. 29, 2021

(87) PCT Pub. No.: WO2021/046547
PCT Pub. Date: Mar. 11, 2021

(65) Prior Publication Data
US 2022/0291387 A1    Sep. 15, 2022

Related U.S. Application Data

(60) Provisional application No. 62/897,122, filed on Sep. 6, 2019.

(51) Int. Cl.
*G01S 17/894* (2020.01)
*G06T 7/55* (2017.01)
(Continued)

(52) U.S. Cl.
CPC .......... *G01S 17/894* (2020.01); *G01B 11/22* (2013.01); *G01S 7/4815* (2013.01); *G01S 7/4816* (2013.01);
(Continued)

(58) Field of Classification Search
CPC ........ G01S 17/894; G01S 17/89; G01S 17/88; G01S 7/4863; G01S 7/4865;
(Continued)

(56) References Cited

U.S. PATENT DOCUMENTS

2015/0131080 A1* 5/2015 Retterath ................ G01S 17/10
356/5.01
2018/0059679 A1 3/2018 Taimouri et al.
(Continued)

OTHER PUBLICATIONS

Application No. PCT/US2020/049770, International Search Report and Written Opinion, dated Feb. 4, 2021, 12 pages.
(Continued)

*Primary Examiner* — Luke D Ratcliffe
(74) *Attorney, Agent, or Firm* — Kilpatrick Townsend & Stockton LLP

(57) ABSTRACT

Systems and methods are provided for processing lidar data. The lidar data can be obtained in a particular manner that allows reconstruction of rectilinear images for which image processing can be applied from image to image. For instance, kernel-based image processing techniques can be used. Such processing techniques can use neighboring lidar and/or associated color pixels to adjust various values associated with the lidar signals. Such image processing of lidar and color pixels can be performed by dedicated circuitry, which may be on a same integrated circuit. Further, lidar pixels can be correlated to each other. For instance, classification techniques can identify lidar and/or associated color pixels as corresponding to the same object. The classification can be performed by an artificial intelligence (AI) coprocessor. Image processing techniques and classification techniques can be combined into a single system.

31 Claims, 21 Drawing Sheets

(51) Int. Cl.
*G06T 7/521* (2017.01)
*G06T 7/246* (2017.01)
*G01B 11/22* (2006.01)
*G01S 7/481* (2006.01)
*G01S 7/4865* (2020.01)

(52) U.S. Cl.
CPC .......... *G01S 7/4817* (2013.01); *G01S 7/4865* (2013.01); *G06T 7/248* (2017.01); *G06T 7/521* (2017.01); *G06T 7/55* (2017.01); *G06T 2207/10028* (2013.01)

(58) Field of Classification Search
CPC ...... G01S 7/4868; G01S 7/487; G01S 7/4873; G01S 7/4876; G01S 7/484; G01S 7/4861; G01S 7/486; G01S 17/931; G01S 7/4815; G01S 7/4816; G01S 7/4817; G06T 7/55; G06T 7/521; G06T 7/248; G06T 2207/10028; G01B 11/22
See application file for complete search history.

(56) References Cited

U.S. PATENT DOCUMENTS

| | | | |
|---|---|---|---|
| 2018/0108134 A1* | 4/2018 | Venable | ................... G06T 7/521 |
| 2018/0329066 A1* | 11/2018 | Pacala | ................... H04N 5/2353 |
| 2019/0011567 A1 | 1/2019 | Pacala et al. | |
| 2019/0079165 A1* | 3/2019 | Retterath | .............. G01S 7/4815 |
| 2019/0179028 A1 | 6/2019 | Pacala et al. | |
| 2020/0400823 A1* | 12/2020 | Talbert | ................... A61B 1/043 |

OTHER PUBLICATIONS

PCT/US2020/049770, "Invitation to Pay Additional Fees and, Where Applicable, Protest Fee", Nov. 16, 2020, 2 pages.

\* cited by examiner

PROCESSING OF LIDAR IMAGES

CROSS-REFERENCES TO RELATED APPLICATIONS

The present application claims priority from and is a PCT application of U.S. Provisional Application No. 62/897,122, entitled "Processing Of Lidar Images" filed Sep. 6, 2019, the entire contents of which is herein incorporated by reference for all purposes.

BACKGROUND

Light Detection And Ranging (LIDAR) systems are used for object detection and ranging, e.g., for vehicles such as cars, trucks, boats, etc. LIDAR systems also have uses in mobile applications (e.g., for face recognition), home entertainment (e.g., to capture gesture capture for video game input), and augmented reality. A LIDAR system measures the distance to an object by irradiating a landscape with pulses from a laser, and then measuring the time for photons to travel to an object and return after reflection, as measured by a receiver of the LIDAR system. A detected signal is analyzed to detect the presence of reflected signal pulses among background light. A distance to an object can be determined based on a time-of-flight from transmission of a pulse to reception of a corresponding reflected pulse.

It can be difficult to provide robust distance accuracy down to a few cm in all conditions, particularly at an economical cost for the LIDAR system. It can be further difficult to provide robust data that provides extensive information about the entirety of a surrounding environment, particularly distant objects. Obtaining advance knowledge of such distance objects can be important for vehicle navigation.

Additionally, in applications such as vehicle navigation, depth information (e.g., distance to objects in the environment) is extremely useful but not sufficient to avoid hazards and navigate safely. It is also necessary to identify specific objects, e.g., traffic signals, lane markings, moving objects that may intersect the vehicle's path of travel, and so on. But, the analysis of 3D points clouds can require extensive computational resources to be performed in real-time for these applications.

BRIEF SUMMARY

The disclosure provides systems and methods for analyzing lidar data. For example, the lidar data can be obtained in a particular manner that allows reconstruction of rectilinear images for which image processing can be applied from image to image. For instance, kernel-based image processing techniques can be used. Such processing techniques can use neighboring lidar and/or associated color pixels to adjust various values associated with the lidar signals. Such image processing of lidar and color pixels can be performed by dedicated circuitry, which may be on a same integrated circuit.

In some embodiments, lidar pixels can be correlated to each other. For instance, classification techniques can identify lidar and/or associated color pixels as corresponding to the same object. The classification can be performed by an artificial intelligence (AI) coprocessor. Image processing techniques and classification techniques can be combined into a single system.

These and other embodiments of the disclosure are described in detail below. For example, other embodiments are directed to systems, devices, and computer readable media associated with methods described herein.

A better understanding of the nature and advantages of embodiments of the present disclosure may be gained with reference to the following detailed description and the accompanying drawings.

TERMS

Figure 1B:
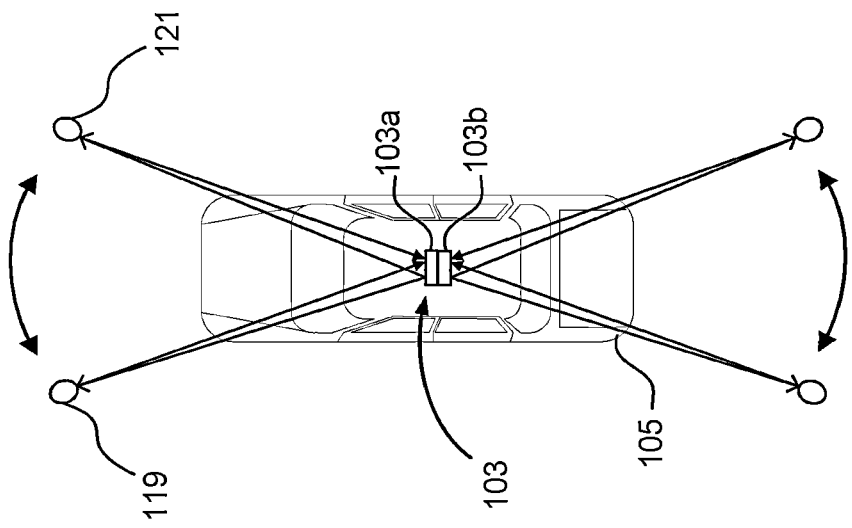
FIGS. 1A and 1B show automotive light ranging devices, also referred to herein as LIDAR systems, according to embodiments of the present disclosure.

The term "ranging," particularly when used in the context of methods and devices for measuring an environment or assisting with vehicle operations, may refer to determining a distance or a distance vector from one location or position to another location or position. "Light ranging" may refer to a type of ranging method that makes use of electromagnetic waves to perform ranging methods or functions. Accordingly, a "light ranging device" may refer to a device for performing light ranging methods or functions. "Lidar" or "LIDAR" may refer to a type of light ranging method that measures a distance to a target by illuminating the target with a pulsed laser light, and thereafter measure the reflected pulses with a sensor. Accordingly, a "lidar device" or "lidar system" may refer to a type of light ranging device for performing lidar methods or functions. A "light ranging system" may refer to a system comprising at least one light ranging device, e.g., a lidar device. The system may further comprise one or more other devices or components in various arrangements.

A "pulse train" may refer to one or more pulses that are transmitted together. The emission and detection of a pulse train may be referred to as a "shot." A shot can occur over a "detection time interval" (or "detection interval").

A "measurement" may include N multiple pulse trains that are emitted and detected over N shots, each lasting a detection time interval. An entire measurement can be over a measurement time interval (or just "measurement interval"), which may equal the N detection interval of a measurement or be longer, e.g., when pauses occur between detection intervals.

A "photosensor" can convert light into an electrical signal. A photosensor may include a plurality of "photodetector," e.g., single-photon avalanche diodes (SPADs). A photosensor can correspond to a particular pixel of resolution in a ranging measurement.

A "histogram" may refer to any data structure representing a series of values over time, as discretized over time bins. A histogram can have a value assigned to each time bin. For example, a histogram can store a counter of a number of photodetectors that fired during a particular time bin in each of one or more detection intervals. As another example, a histogram can correspond to the digitization of an analog signal at different times. A histogram can be include signal (e.g., pulses) and noise. Thus, a histogram can be considered a combination of signal and noise as a photon time series or photon flux. A raw/digitized histogram (or accumulated photon time series) can contain the signal and the noise as digitized in memory without filtering. A "filtered histogram" may refer to the output after the raw histogram is passed through a filter.

An emitted signal/pulse may refer to the "nominal", "ideal," or "template" pulse or pulse train that is not distorted. A reflected signal/pulse may refer to the reflected laser pulse from an object and may be distorted. A digitized signal/pulse (or raw signal) may refer to the digitized result from the detection of one or more pulse trains of a detection interval as stored in memory, and thus may be equivalent to a portion of a histogram. A detected signal/pulse may refer to the location in memory that the signal was detected. A detected pulse train may refer to the actual pulse train found by a matched filter. An anticipated signal profile may refer to a shape of a digitized signal resulting from a particular emitted signal that has a particular distortion in the reflected signal.

A lidar image may form a two-dimensional (2D) image that is composed of a rectilinear grid of lidar pixels. The number of rows and columns may be reproducible from one image to another, so that a set of images have the same number of rows and columns of lidar pixels. As an example, a lidar (depth) pixel can have three values: a depth value, a peak value (also referred to as a signal value), and a noise value. A series of lidar images may be collected as a set of frames that may be replayed and/or analyzed together. A three-dimensional position can be defined for a lidar pixel based on the row and column of the pixel in the 2D image and the depth value.

DETAILED DESCRIPTION

The disclosure provides systems and methods for analyzing lidar data. For example, the lidar data can be obtained in a particular manner that allows reconstruction of rectilinear images for which image processing can be applied from image to image. Sensor IDs (potentially with position information of a light ranging device) can enable consistent mapping of signals to a lidar pixel from image to image.

For the image processing, kernel-based image processing techniques can be used on the images. Such processing techniques can use neighboring lidar and/or associated color pixels to adjust various values associated with the lidar signals, such as depth values, peak values, and a detection threshold, which can be used for detecting a reflected pulse. Such image processing of lidar and color pixels can be performed by dedicated circuitry, which may be on a same integrated circuit.

In some embodiments, lidar pixels can be correlated to each other. For instance, classification techniques can identify lidar and/or associated color pixels as corresponding to the same object. The classification can be performed by an artificial intelligence (AI) coprocessor. Image processing techniques and classification techniques can be combined into a single system. A further example can detect key points in objects, e.g., for image registration or determination of velocities.

I. Illustrative Automotive Lidar System

Figure 1A:
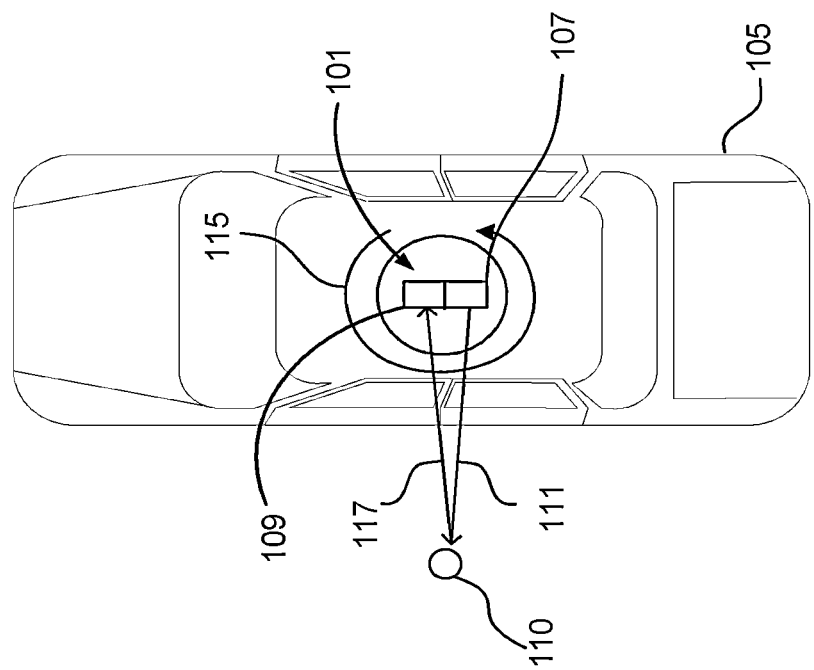

FIGS. 1A-1B show automotive light ranging devices, also referred to herein as LIDAR systems, according to some embodiments. The automotive application for the LIDAR systems is chosen here merely for the sake of illustration and the sensors described herein may be employed in other types of vehicles, e.g., boats, aircraft, trains, etc., as well as in a variety of other applications where 3D depth images are useful, such as medical imaging, mobile phones, augmented reality, geodesy, geomatics, archaeology, geography, geology, geomorphology, seismology, forestry, atmospheric physics, laser guidance, airborne laser swath mapping (ALSM), and laser altimetry. According to some embodiments, a LIDAR system, e.g., scanning LIDAR system 101 and/or solid state LIDAR system 103, can be mounted on the roof of a vehicle 105 as shown in FIGS. 1A and 1B.

The scanning LIDAR system 101 shown in FIG. 1A can employ a scanning architecture, where the orientation of the LIDAR light source 107 and/or detector circuitry 109 can be scanned around one or more fields of view 110 within an external field or scene that is external to the vehicle 105. In the case of the scanning architecture, the emitted light 111 can be scanned over the surrounding environment as shown. For example, the output beam(s) of one or more light sources (such as infrared or near-infrared pulsed IR lasers, not shown) located in the LIDAR system 101, can be scanned, e.g., rotated, to illuminate a scene around the vehicle. In some embodiments, the scanning, represented by rotation arrow 115, can be implemented by mechanical means, e.g., by mounting the light emitters to a rotating column or platform. In some embodiments, the scanning can be implemented through other mechanical means such as through the use of galvanometers. Chip-based steering techniques can also be employed, e.g., by using microchips that employ one or more MEMS based reflectors, e.g., such as a digital micromirror (DMD) device, a digital light processing (DLP) device, and the like. In some embodiments, the scanning can be effectuated through non-mechanical means, e.g., by using electronic signals to steer one or more optical phased arrays.

For a stationary architecture, like solid state LIDAR system 103 shown in FIG. 1B, one or more solid state LIDAR subsystems (e.g., 103a and 103b) can be mounted to the vehicle 105. Each solid state LIDAR unit can face a different direction (possibly with partially and/or non-overlapping fields of views between units) so as to capture a composite field of view that is larger than each unit is capable of capturing on its own.

In either the scanning or stationary architectures, objects within the scene can reflect portions of the light pulses that are emitted from the LIDAR light sources. One or more reflected portions then travel back to the LIDAR system and can be detected by the detector circuitry. For example, reflected portion 117 can be detected by detector circuitry 109. The detector circuitry can be disposed in the same housing as the emitters. Aspects of the scanning system and stationary system are not mutually exclusive and thus can be used in combination. For example, the individual LIDAR subsystems 103a and 103b in FIG. 1B can employ steerable emitters such as an optical phased array or whole the composite unit may rotate through mechanical means thereby scanning the entire scene in front of the LIDAR system, e.g., from field of view 119 to field of view 121.

Figure 2:
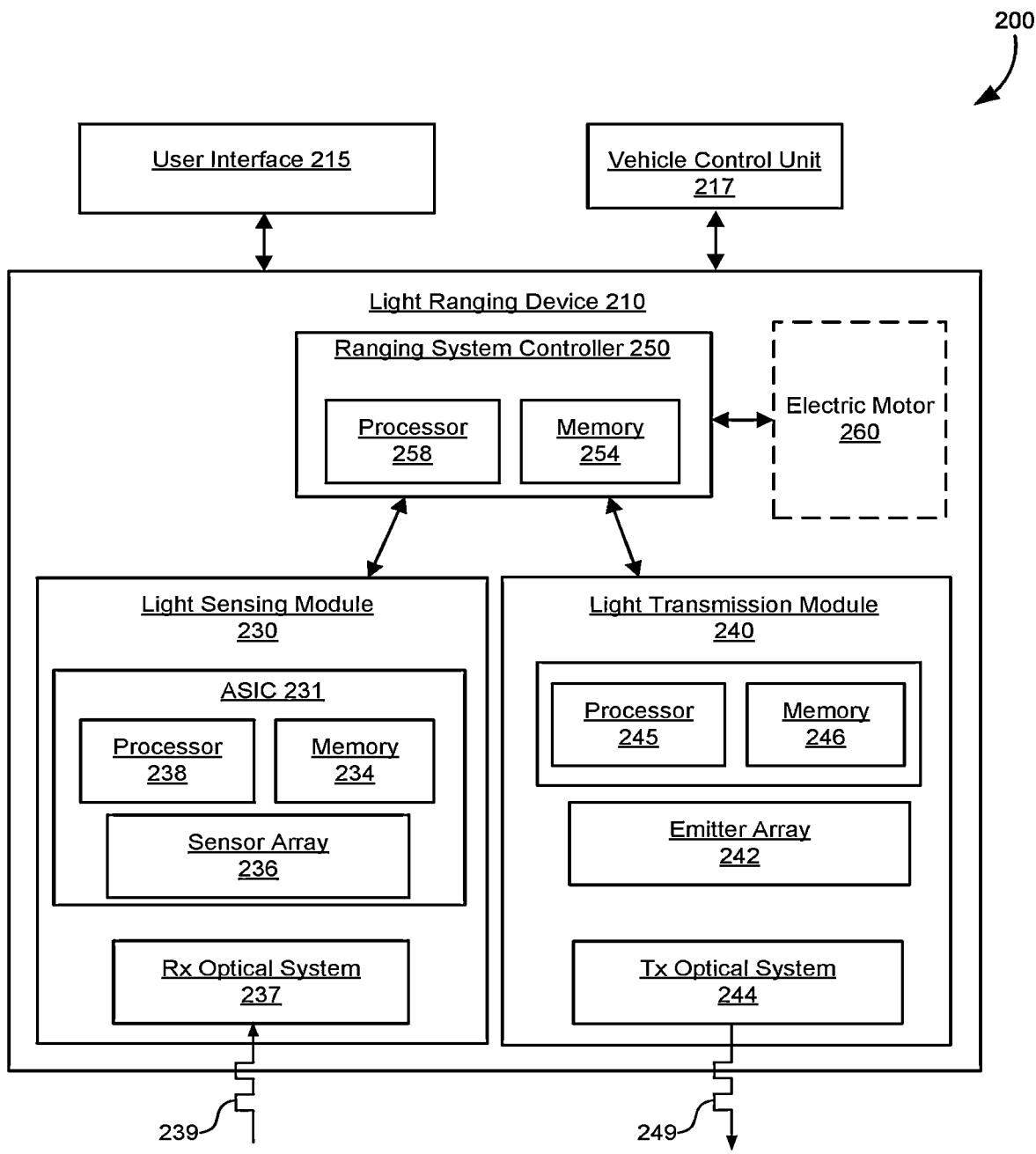
FIG. 2 shows a block diagram of an exemplary lidar device for implementing various embodiments.

FIG. 2 illustrates a more detailed block diagram of a rotating LIDAR system 200 according to some embodiments. More specifically, FIG. 2 optionally illustrates a rotating LIDAR system that can employ a rotary actuator on a rotating circuit board, which can receives power and data (as well as transmit) from a stationary circuit board.

LIDAR system 200 can interact with one or more instantiations of user interface 215. The different instantiations of user interface 215 can vary and may include, e.g., a computer system with a monitor, keyboard, mouse, CPU and memory; a touch-screen in an automobile; a handheld device with a touch-screen; or any other appropriate user interface. The user interface 215 may be local to the object upon which the LIDAR system 200 is mounted but can also be a remotely operated system. For example, commands and data to/from the LIDAR system 200 can be routed through a cellular network (LTE, etc.), a personal area network (Bluetooth, Zigbee, etc.), a local area network (WiFi, IR, etc.), or a wide area network such as the Internet.

The user interface 215 of hardware and software can present the LIDAR data from the device to the user but can also allow a user to control the LIDAR system 200 with one or more commands. Example commands can include commands that activate or deactivate the LIDAR system, specify photo-detector exposure level, bias, sampling duration and other operational parameters (e.g., emitted pulse patterns and signal processing), specify light emitters parameters such as brightness. In addition, commands can allow the user to select the method for displaying results. The user interface can display LIDAR system results which can include, e.g., a single frame snapshot image, a constantly updated video image, and/or a display of other light measurements for some or all pixels. In some embodiments, user interface 215 can track distances (proximity) of objects from the vehicle, and potentially provide alerts to a driver or provide such tracking information for analytics of a driver's performance.

In some embodiments, the LIDAR system can communicate with a vehicle control unit 217 and one or more parameters associated with control of a vehicle can be modified based on the received LIDAR data. For example, in a fully autonomous vehicle, the LIDAR system can provide a real time 3D image of the environment surrounding the car to aid in navigation. In other cases, the LIDAR system can be employed as part of an advanced driver-assistance system (ADAS) or as part of a safety system that, e.g., can provide 3D image data to any number of different systems, e.g., adaptive cruise control, automatic parking, driver drowsiness monitoring, blind spot monitoring, collision avoidance systems, etc. When a vehicle control unit 217 is communicably coupled to light ranging device 210, alerts can be provided to a driver or tracking of a proximity of an object can be tracked.

The LIDAR system 200 shown in FIG. 2 includes the light ranging device 210. The light ranging device 210 includes a ranging system controller 250, a light transmission (Tx) module 240 and a light sensing (Rx) module 230. Ranging data can be generated by the light ranging device by transmitting one or more light pulses 249 from the light transmission module 240 to objects in a field of view surrounding the light ranging device. Reflected portions 239 of the transmitted light are then detected by the light sensing module 230 after some delay time. Based on the delay time, the distance to the reflecting surface can be determined. Other ranging methods can be employed as well, e.g. continuous wave, Doppler, and the like.

The Tx module 240 includes an emitter array 242, which can be a one-dimensional or two-dimensional array of emitters, and a Tx optical system 244, which when taken together can form an array of micro-optic emitter channels. Emitter array 242 or the individual emitters are examples of laser sources. The Tx module 240 further includes processor 245 and memory 246. In some embodiments, a pulse coding technique can be used, e.g., Barker codes and the like. In such cases, memory 246 can store pulse-codes that indicate when light should be transmitted. In one embodiment the pulse-codes are stored as a sequence of integers stored in memory.

The Rx module 230 can include sensor array 236, which can be, e.g., a one-dimensional or two-dimensional array of photosensors. Each photosensor or photosensitive element (also referred to as a sensor) can include a collection of photodetectors, e.g., APDs or the like, or a sensor can be a single photon detector (e.g., a SPAD). Like the Tx module 240, Rx module 230 includes an Rx optical system 237. The Rx optical system 237 and sensor array 236 taken together can form an array of micro-optic receiver channels. Each micro-optic receiver channel measures light that corresponds to an image pixel in a distinct field of view of the surrounding volume. Each sensor (e.g., a collection of SPADs) of sensor array 236 can correspond to a particular emitter of emitter array 242, e.g., as a result of a geometrical configuration of light sensing module 230 and light transmission module 240.

In one embodiment, the sensor array 236 of the Rx module 230 is fabricated as part of a monolithic device on a single substrate (using, e.g., CMOS technology) that includes both an array of photon detectors and an ASIC 231 for signal processing the raw histograms from the individual photon detectors (or groups of detectors) in the array. As an example of signal processing, for each photon detector or grouping of photon detectors, memory 234 (e.g., SRAM) of the ASIC 231 can accumulate counts of detected photons over successive time bins, and these time bins taken together can be used to recreate a time series of the reflected light pulse (i.e., a count of photons vs. time). This time-series of aggregated photon counts is referred to herein as an intensity histogram (or just histogram). The ASIC 231 can implement matched filters and peak detection processing to identify return signals in time. In addition, the ASIC 231 can accomplish certain signal processing techniques (e.g., by a signal processor 238), such as multi-profile matched filtering to help recover a photon time series that is less susceptible to pulse shape distortion that can occur due to SPAD saturation and quenching. In some embodiments, all or parts of such filtering can be performed by processor 258, which may be embodied in an FPGA. In some examples, signal processor 238 and memory 234 may be considered part of ranging circuitry. For example, signal processor 238 can count photodetectors that detect photons during a measurement to form a histogram, which can be used to detect a peak that corresponds to a range (depth) value.

In some embodiments, the Rx optical system 237 can also be part of the same monolithic structure as the ASIC, with separate substrate layers for each receiver channel layer. For example, an aperture layer, collimating lens layer, an optical filter layer and a photo-detector layer can be stacked and bonded at the wafer level before dicing. The aperture layer can be formed by laying a non-transparent substrate on top of a transparent substrate or by coating a transparent substrate with an opaque film. In yet other embodiments, one or more components of the Rx module 230 may be external to the monolithic structure. For example, the aperture layer may be implemented as a separate metal sheet with pinholes.

In some embodiments, the photon time series output from the ASIC are sent to the ranging system controller 250 for further processing, e.g., the data can be encoded by one or more encoders of the ranging system controller 250 and then sent as data packets to user interface 215. The ranging system controller 250 can be realized in multiple ways including, e.g., by using a programmable logic device such an FPGA, as an ASIC or part of an ASIC, using a processor 258 with memory 254, and some combination of the above. The ranging system controller 250 can cooperate with a stationary base controller or operate independently of the base controller (via pre-programed instructions) to control the light sensing module 230 by sending commands that include start and stop light detection and adjust photo-detector parameters. Similarly, the ranging system controller 250 can control the light transmission module 240 by sending commands, or relaying commands from the base controller, that include start and stop light emission controls and controls that can adjust other light-emitter parameters (e.g., pulse codes). In some embodiments, the ranging system controller 250 has one or more wired interfaces or connectors for exchanging data with the light sensing module 230 and with the light transmission module 240. In other embodiments, the ranging system controller 250 communicates with the light sensing module 230 and light transmission module 240 over a wireless interconnect such as an optical communication link.

The electric motor 260 may be an optional component needed when system components, e.g., the Tx module 240 and or Rx module 230, need to rotate. The system controller 250 controls the electric motor 260 and can start rotation, stop rotation and vary the rotation speed.

Light ranging device 210 may further include a lidar image processor and an AI coprocessor. For a scanning system, light ranging device 210 can include an image reconstruction processor, e.g., which can generate a 2D image from measurements made over a given cycle (e.g., 360° revolution). Such an image reconstruction processor (e.g., ranging system controller 250) can buffer incoming data and assign lidar pixels to pixels in an image according to a mapping table/function, thereby reconstructing an image. The image can be constructed in that the lidar pixels already exist but are arranged to form an image, e.g., a rectilinear image that is consistent in resolution from one image to another. Other processors can use the reconstructed image to provide a final processed image or to provide other data. These processors, ranging system controller 250, light sensing module 230, and light transmission module 240 can be on the same or on various integrated circuits.

II. Detection of Reflected Pulses

The photosensors can be arranged in a variety of ways for detecting reflected pulses. For example, the photosensors can be arranged in an array, and each photosensor can include an array of photodetectors (e.g., SPADs). Different patterns of pulses (pulse trains) transmitted during a detection interval are also described below.

A. Time-of-Flight Measurements and Detectors

Figure 3:
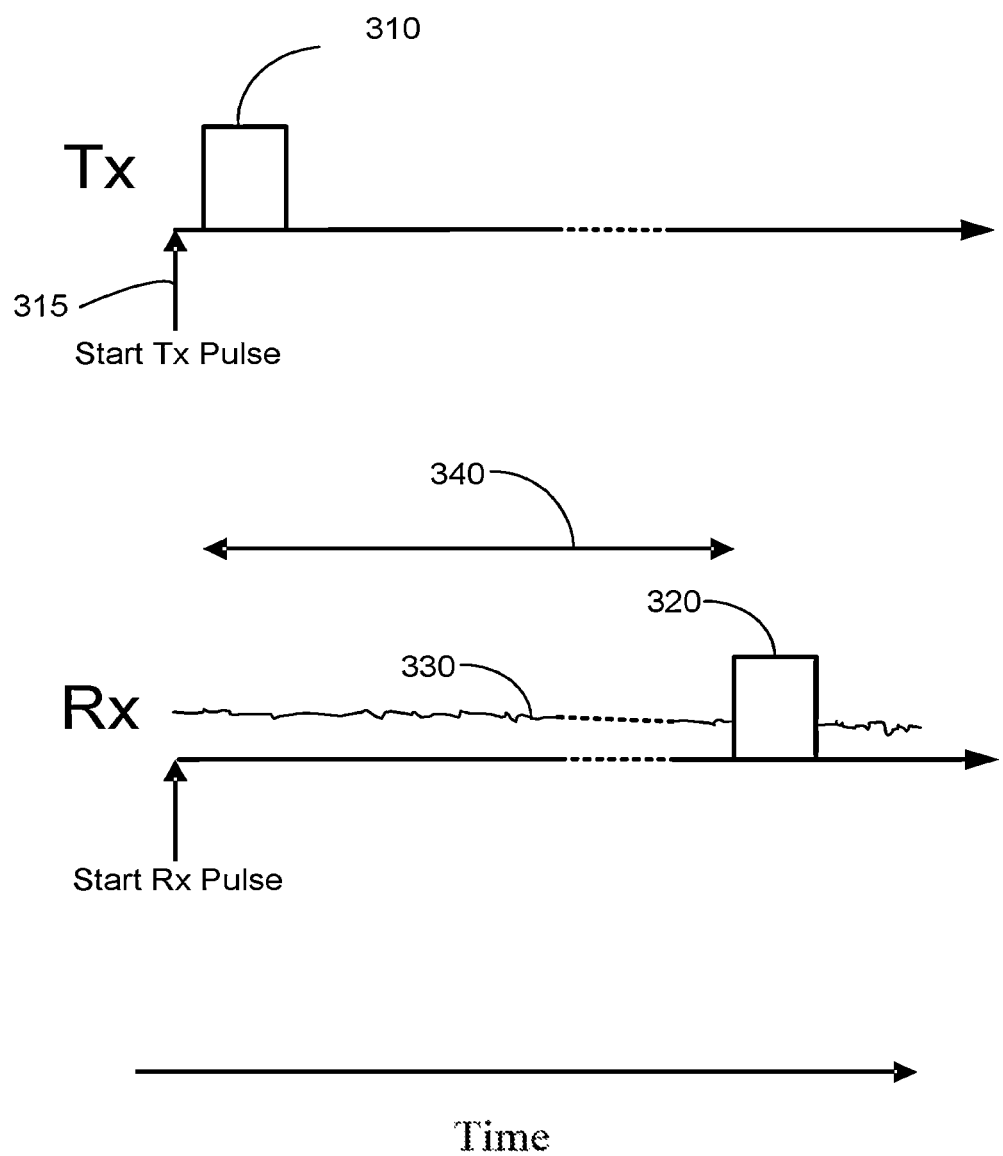
FIG. 3 illustrates the operation of a typical lidar system that may be improved by embodiments.

FIG. 3 illustrates the operation of a typical LIDAR system that may be improved by some embodiments. A laser generates a light pulse 310 of short duration. The horizontal axis represents time and the vertical axis represents power. An example laser pulse duration, characterized by the full-width half maximum (FWHM), is a few nanoseconds, with the peak power of a single emitter being around a few watts. Embodiments that use side emitter lasers or fiber lasers may have much higher peak powers, while embodiments with small diameter VCSELs could have peak powers in the tens of milliwatts to hundreds of milliwatts.

A start time 315 for the transmission of the pulse does not need to coincide with the leading edge of the pulse. As shown, the leading edge of light pulse 310 may be after the start time 315. One may want the leading edge to differ in situations where different patterns of pulses are transmitted at different times, e.g., for coded pulses.

An optical receiver system can start detecting received light at the same time as the laser is started, i.e., at the start time. In other embodiments, the optical receiver system can start at a later time, which is at a known time after the start time for the pulse. The optical receiver system detects background light 330 initially and after some time detects the laser pulse reflection 320. The optical receiver system can compare the detected light intensity against a detection threshold to identify the laser pulse reflection 320. The detection threshold can distinguish the background light 330 from light corresponding to the laser pulse reflection 320.

The time-of-flight 340 is the time difference between the pulse being sent and the pulse being received. The time difference can be measured by subtracting the transmission time of the pulse (e.g., as measured relative to the start time) from a received time of the laser pulse reflection 320 (e.g., also measured relative to the start time). The distance to the target can be determined as half the product of the time-of-flight and the speed of light. Pulses from the laser device reflect from objects in the scene at different times and the pixel array detects the pulses of radiation reflection.

B. Detection of Objects Using Array Lasers and Array of Photosensors

Figure 4:
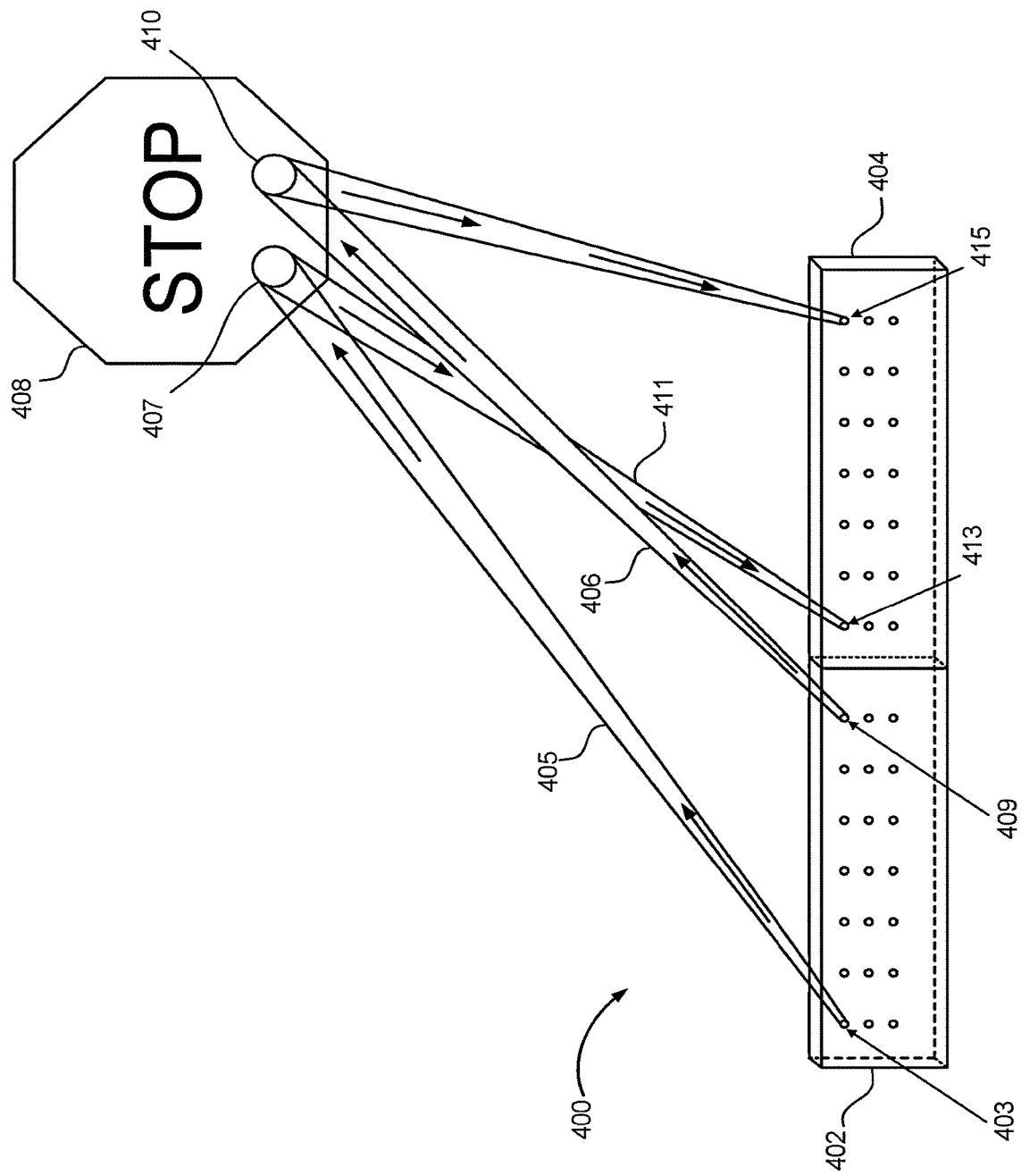
FIG. 4 shows an illustrative example of the light transmission and detection process for a light ranging system according to embodiments of the present disclosure.

FIG. 4 shows an illustrative example of the light transmission and detection process for a light ranging system, according to some embodiments. FIG. 4 shows a light ranging system (e.g., solid state or and/or scanning) collecting three-dimensional distance data of a volume or scene that surrounds the system. FIG. 4 is an idealized drawing to highlight relationships between emitters and sensors, and thus other components are not shown.

Light ranging system 400 includes a light emitter array 402 and a light sensor array 404. The light emitter array 402 includes an array of light emitters, e.g., an array of VCSELs and the like, such as emitter 403 and emitter 409. Light sensor array 404 includes an array of photosensors, e.g., sensors 413 and 415. The photosensors can be pixelated light sensors that employ, for each pixel, a set of discrete photodetectors such as single photon avalanche diodes (SPADs) and the like. However, various embodiments can deploy any type of photon sensors.

Each emitter can be slightly offset from its neighbor and can be configured to transmit light pulses into a different field of view from its neighboring emitters, thereby illuminating a respective field of view associated with only that emitter. For example, emitter 403 emits an illuminating beam 405 (formed from one or more light pulses) into the circular field of view 407 (the size of which is exaggerated for the sake of clarity). Likewise, emitter 409 emits an illuminating beam 406 (also called an emitter channel) into the circular field of view 410. While not shown in FIG. 4 to avoid complication, each emitter emits a corresponding illuminating beam into its corresponding field of view resulting in a 2D array of fields of view being illuminated (21 distinct fields of view in this example).

Each field of view that is illuminated by an emitter can be thought of as a pixel or spot in the corresponding 3D image that is produced from the ranging data. Each emitter channel can be distinct to each emitter and be non-overlapping with other emitter channels, i.e., there is a one-to-one mapping between the set of emitters and the set of non-overlapping fields or view. Thus, in the example of FIG. 4, the system can sample 21 distinct points in the 3D space. A denser sampling of points can be achieved by having a denser array of emitters or by scanning angular position of the emitter beams over time such that one emitter can sample several points in space. As described above, scanning can be accomplished by rotating the entire emitter/sensor assembly.

Each sensor can be slightly offset from its neighbor and, like the emitters described above, each sensor can see a different field of view of the scene in front of the sensor. Furthermore, each sensor's field of view substantially coincides with, e.g., overlaps with and is the same size as a respective emitter channel's field of view.

In FIG. 4, the distance between corresponding emitter-sensor channels is exaggerated relative to the distance to objects in the field of view. In practice, the distance to the objects in the field of few is much greater than the distance between corresponding emitter-sensor channels and thus the path of light from the emitter to the object is approximately parallel to the path of the reflected light back from the object to the sensor (i.e., it is almost "back reflected"). Accordingly, there is a range of distances in front of the system 400 over which the fields of view of individual sensors and emitters are overlapped.

Because the fields of view of the emitters are overlapped with the fields of view of their respective sensors, each sensor channel ideally can detect the reflected illumination beam that originates from its respective emitter channel with ideally no cross-talk, i.e., no reflected light from other illuminating beams is detected. Thus, each photosensor can correspond to a respective light source. For example, emitter 403 emits an illuminating beam 405 into the circular field of view 407 and some of the illuminating beam reflects from the object 408. Ideally, a reflected beam 411 is detected by sensor 413 only. Thus, emitter 403 and sensor 413 share the same field of view, e.g., field of view 407, and form an emitter-sensor pair. Likewise, emitter 409 and sensor 415 form an emitter-sensor pair, sharing field of view 410. While the emitter-sensor pairs are shown in FIG. 4 as being in the same relative locations in their respective array, any emitter can be paired with any sensor depending on the design of the optics used in the system.

During a ranging measurement, the reflected light from the different fields of view distributed around the volume surrounding the LIDAR system is collected by the various sensors and processed, resulting in range information for any objects in each respective field of view. As described above, a time-of-flight technique can be used in which the light emitters emit precisely timed pulses, and the reflections of the pulses are detected by the respective sensors after some elapsed time. The elapsed time between emission and detection and the known speed of light is then used to compute the distance to the reflecting surface. In some embodiments, additional information can be obtained by the sensor to determine other properties of the reflecting surface in addition to the range. For example, the Doppler shift of a pulse can be measured by the sensor and used to compute the relative velocity between the sensor and the reflecting surface. The pulse strength can be used to estimate the target reflectivity, and the pulse shape can be used to determine if the target is a hard or diffuse material.

In some embodiments, the LIDAR system can be composed of a relatively large 2D array of emitter and sensor channels and operate as a solid state LIDAR, i.e., it can obtain frames of range data without the need to scan the orientation of the emitters and/or sensors. In other embodiments, the emitters and sensors can be scanned, e.g., rotated about an axis, to ensure that the fields of view of the sets of emitters and sensors sample a full 360 degree region (or some useful fraction of the 360 degree region) of the surrounding volume. The range data collected from the scanning system, e.g., over some predefined time period, can then be post-processed into one or more frames of data that can then be further processed into one or more depth images or 3D point clouds. The depth images and/or 3D point clouds can be further processed into map tiles for use in 3D mapping and navigation applications.

C. Multiple Photodetectors in Each Photosensor

Figure 5:
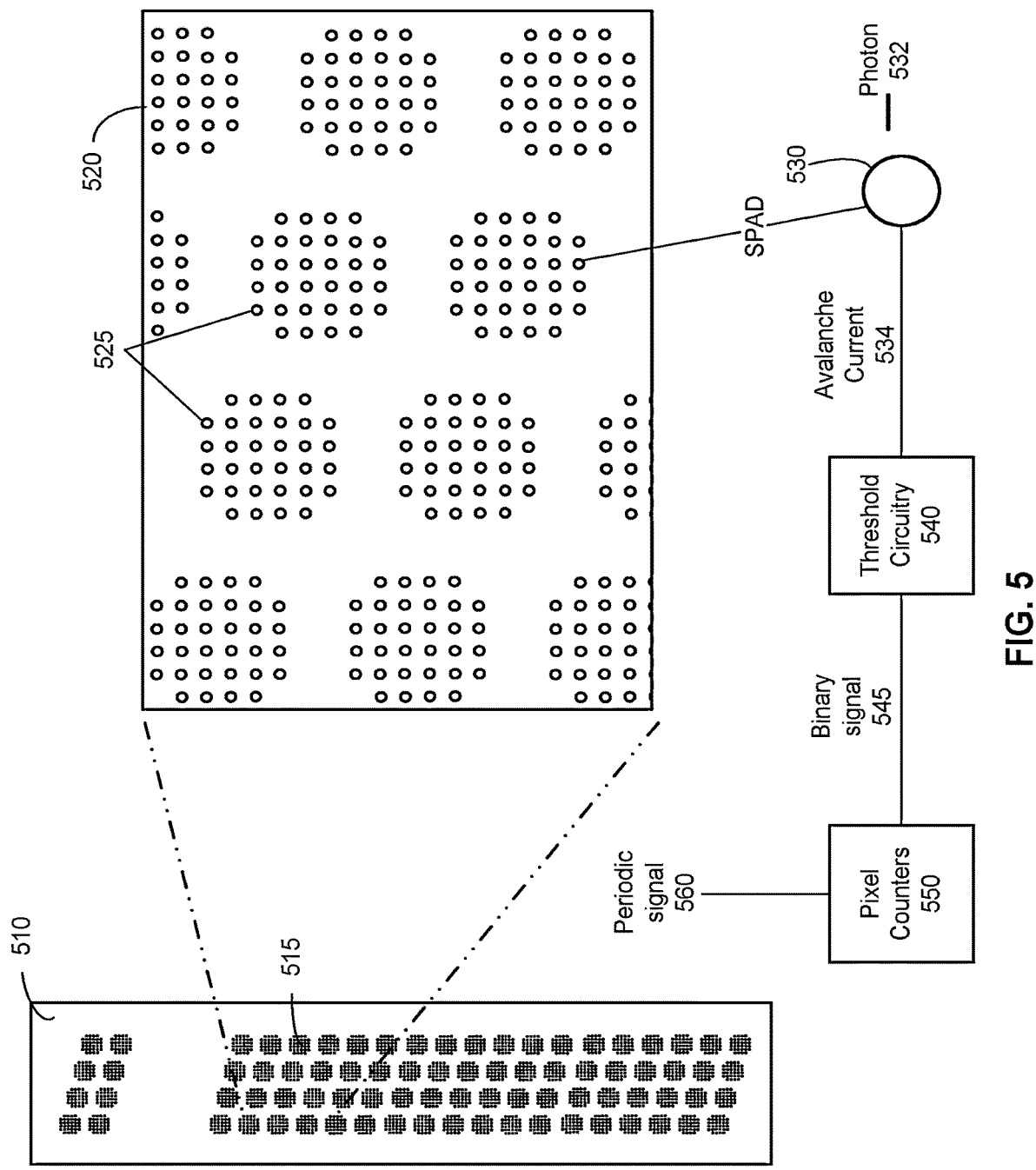
FIG. 5 shows various stages of a sensor array and associated electronics according to embodiments of the present disclosure.

FIG. 5 shows various stages of a sensor array and associated electronics according to embodiments of the present invention. Array 510 shows photosensors 515 (also called pixel sensors) that each correspond to a different pixel. Array 510 can be a staggered array. In this specific example, array 510 is 18×4 photosensors. Array 510 can be used to achieve a high resolution (e.g. 72×1024) as the implementation is amenable to sweeping.

Array 520 shows a magnified view of a portion of array 510. As can be seen, each photosensor 515 is composed of a plurality of photodetectors 525. Signals from the photodetectors of a pixel collectively contribute to a measurement for that pixel. As shown, the photosensors 515 in array 510 can be staggered, resulting in a staggered array. As array 510 scans (e.g., by motion, such as rotation, or use of a moving mirror) in incremental steps corresponding to one column at a time, the photosensors 515 provide a vertical resolution of the number of rows times the number of columns. The staggered array allows the photosensors to include more photodetectors 525 than otherwise could be included for the same vertical resolution.

In some embodiments, each pixel has a multitude of single-photon avalanche diode (SPAD) units that increase the dynamic range of the pixel itself. Each SPAD can have an analog front end circuit for biasing, quenching, and recharging. SPADs are normally biased with a biased voltage above the breakdown voltage. A suitable circuit senses the leading edge of the avalanche current, generates a standard output pulse synchronous with the avalanche build-up, quenches the avalanche by lowering the bias down below the breakdown voltage, and restore the photodiode to the operative level.

The SPADs may be positioned so as to maximize the fill factor in their local area, or a microlens array may be used, which allows for high optical fill factors at the pixel level. Accordingly, an imager pixel can includes an array of SPADs to increase the efficiency of the pixel detector. A diffuser may be used to spreads rays passed through an aperture and collimated by a microlens. The can diffuser serves to spread the collimated rays in a way that all the SPADs belonging to the same pixel receive some radiation.

FIG. 5 further shows a particular photodetector 530 (e.g., a SPAD) that detects a photon 532. In response to the detection, photodetector 530 produces an avalanche current 534 of charge carriers (electrons or holes). Threshold circuitry 540 conditions the avalanche current 534 by comparing it to a threshold. When a photon is detected and photodetector 530 is functioning properly, the avalanche current 534 rises above the comparator threshold and threshold circuitry 540 produces a temporally accurate binary signal 545 indicating the accurate time of the SPAD current avalanche, which is in turn an accurate measurement of the photon arrival. The correlation of the current avalanche to the photon arrival can occur with a resolution of nanoseconds, thereby providing high timing resolution. The rising edge of binary signal 545 can be latched by pixel counters 550, which may be part of ranging circuitry.

Binary signal 545, avalanche current 534, and pixel counters 550 are examples of data values that can be provided by a photosensor composed of one or more SPADs. The data values can determined from respective signals from each of the plurality of photodetectors. Each of the respective signals can be compared to a threshold to determine whether a corresponding photodetector triggered. Avalanche current 534 is an example of an analog signal, and thus the respective signals can be analog signals.

Pixel counters 550 can use binary signal 545 to count the number of photodetectors for a given pixel that have been triggered by one or more photons during a particular time bin (e.g., a time window of 1, 2, 3, etc. ns) as controlled by periodic signal 560. Pixel counters 550 can store counters for each of a plurality of time bins for a given measurement. The value of the counter for each time bind can start at zero and be incremented based on binary signal 545 indicating a detection of a photon. The counter can increment when any photodetector of the pixel provide such a signal.

Periodic signal 560 can be produced by a phase-locked loop (PLL) or delay-locked loop (DLL) or any other method of producing a clock signal. The coordination of periodic signal 560 and pixel counter 550 can act as a time-to-digital converter (TDC), which is a device for recognizing events and providing a digital representation of the time they occurred. For example, a TDC can output the time of arrival for each detected photon or optical pulse. The measure time can be an elapsed time between two events (e.g., start time and detected photon or optical pulse) rather than an absolute time. Periodic signal 560 can be a relatively fast clock that switches between a bank of memory comprising pixel counter 550. Each register in memory can correspond to one histogram bin, and the clock can switch between them at the sampling interval. Accordingly, a binary value indicating a triggering can be sent to the histogram circuitry when the respective signal is greater than the threshold. The histogram circuitry can aggregate binary values across the plurality of photodetectors to determine a number of photodetectors that triggered during a particular time bin.

The time bins can be measured relative to a start signal, e.g., at start time 315 of FIG. 3. Thus, the counters for time bins right after the start signal may have low values corresponding to a background signal, e.g., background light 330. A last time bin can correspond to an end of a detection time interval (also called a shot) for a given pulse train, which is further described in the next section. The number of cycles of periodic signal 560 since a start time can act as a timestamp for when a rising edge of avalanche current 534 indicates a detected photon. The timestamp corresponds to the time bin for a particular counter in pixel counters 550. Such an operation is different from a simple analog-to-digital converter (ADC) following a photodiode (e.g., as for an avalanche photodiode (APD)). Each of the counters of the time bins can correspond to a histogram, which is described in more detail below. Therefore, while the APD is a linear amplifier for the input optical signal with limited gain, the SPAD is a trigger device that provides a binary output of yes/no for a triggering event occurring in a time window.

D. Pulse Trains

Ranging may also be accomplished by using a pulse train, defined as containing one or more pulses. Within a pulse train, the number of pulses, the widths of the pulses, and the time duration between pulses (collectively referred to as a pulse pattern) can be chosen based on a number of factors, some of which includes:

1—Maximum laser duty cycle—The duty cycle is the fraction of time the laser is on. For a pulsed laser this could be determined by the FWHM as explained above and the number of pulses emitted during a given period.

2—Eye safety limits—This is determined by maximum amount of radiation a device can emit without damaging the eyes of a bystander who happens to be looking in the direction of the LIDAR system.

3—Power consumption—This is the power that the emitter consumes for illuminating the scene.

For example, the spacing between pulses in a pulse train can be on the order of single digits or 10 s of nanoseconds.

Multiple pulse trains can be emitted during the time span of one measurement. Each pulse train can correspond to a different time interval, e.g., a subsequent pulse train is not emitted until an expiration of the time limit for detecting reflected pulses of a previous pulse train.

For a given emitter or laser device, the time between the emissions of pulse trains determines the maximum detectable range. For example, if pulse train A is emitted at time $t_0=0$ ns, and pulse train B is emitted at time $t_1=1000$ ns, then one must not assign reflected pulse trains detected after $t_1$ to pulse train A, as they are much more likely to be reflections from pulse train B. Thus, the time between pulse trains and the speed of light define a maximum bound on the range of the system given in the following equation.

$$R_{max}=c \times (t_1-t_0)/2$$

The time between shots (emission and detection of pulse trains) can be on the order of 1 μs to allow enough time for the entire pulse train to travel to a distant object approximately 150 meters away and then back.

III. Histogram Signals from Photodetectors

One mode of operation of a LIDAR system is time-correlated single photon counting (TCSPC), which is based on counting single photons in a periodic signal. This technique works well for low levels of periodic radiation, which is suitable in a LIDAR system. This time correlated counting may be controlled by periodic signal 560 of FIG. 5 and may use time bins, as discussed for FIG. 5.

The frequency of the periodic signal can specify a time resolution within which data values of a signal are measured. For example, one measured value can be obtained for each photosensor per cycle of the periodic signal. In some embodiments, the measurement value can be the number of photodetectors that the triggered during that cycle. The time period of the periodic signal corresponds to time bin, with each cycle being a different time bin.

Figure 6:
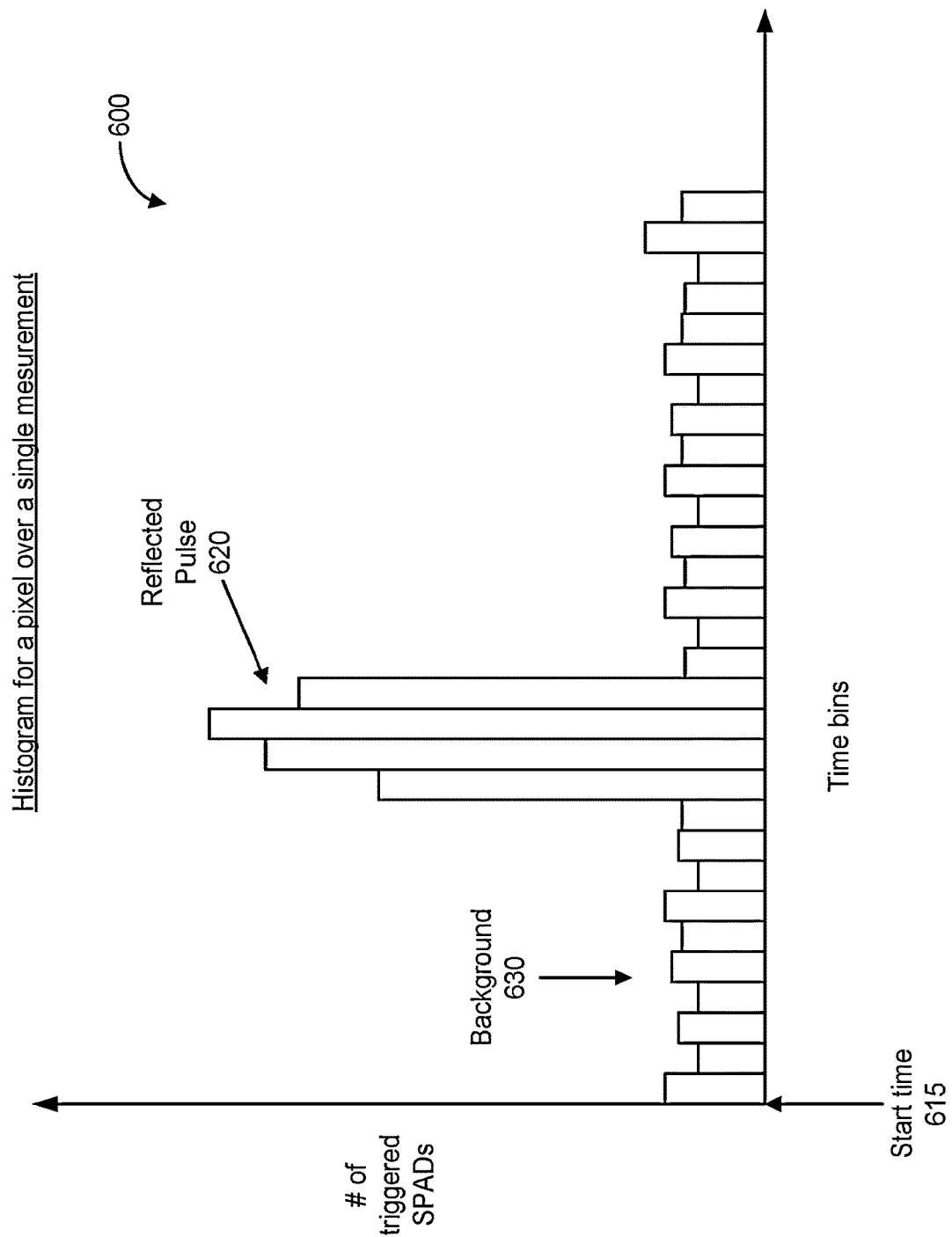
FIG. 6 shows a histogram according to embodiments of the present disclosure.

FIG. 6 shows a histogram 600 according to embodiments of the present invention. The horizontal axis corresponds to time bins as measured relative to start time 615. As described above, start time 615 can correspond to a start time for the pulse train. Any offsets between rising edges of the first pulse of a pulse train and the start time for either or both of a pulse train and a detection time interval can be accounted for wherein determining the received time to be used for the time-of-flight measurement. The vertical axis corresponds to the number of triggered SPADs. In certain embodiments, the vertical axis may correspond to an output of an ADC that follows an APD. For example, APDs can exhibit traditional saturation effects, such as a constant maximum signal rather than the dead-time based effects of SPADs. Some effects can occur for both SPADs and APDs, e.g., pulse smearing of very oblique surfaces may occur for both SPADs and APDs.

The counter for each of the time bins corresponds to a different bar in histogram 600. The counters at the early time bins are relatively low and correspond to background noise 630. At some point, a reflected pulse 620 is detected. The corresponding counters are much larger, and may be above a threshold that discriminate between background and a detected pulse. The reflected pulse 620 (after digitizing) is shown corresponding to four time bins, which might result from a laser pulse of a similar width, e.g., a 4 ns pulse when time bins are each 1 ns. But, as described in more detail below, the number of time bins can vary, e.g., based on properties of a particular object in an angle of incidence of the laser pulse.

The temporal location of the time bins corresponding to reflected pulse 620 can be used to determine the received time, e.g., relative to start time 615. As described in more detail below, matched filters can be used to identify a pulse pattern, thereby effectively increasing the signal-to-noise ratio, but also to more accurately determine the received time. In some embodiments, the accuracy of determining a received time can be less than the time resolution of a single time bin. For instance, for a time bin of 1 ns, that resolution would correspond to about 15 cm. However, it can be desirable to have an accuracy of only a few centimeters.

Accordingly, a detected photon can result in a particular time bin of the histogram being incremented based on its time of arrival relative to a start signal, e.g., as indicated by start time 615. The start signal can be periodic such that multiple pulse trains are sent during a measurement. Each start signal can be synchronized to a laser pulse train, with multiple start signals causing multiple pulse trains to be transmitted over multiple detection intervals. Thus, a time bin (e.g., from 200 to 201 ns after the start signal) would occur for each detection interval. The histogram can accumulate the counts, with the count of a particular time bin corresponding to a sum of the measured data values all occurring in that particular time bin across multiple shots. When the detected photons are histogrammed based on such a technique, it results in a return signal with a signal to noise ratio greater than from a single pulse train by the square root of the number of shots taken.

Figure 7:
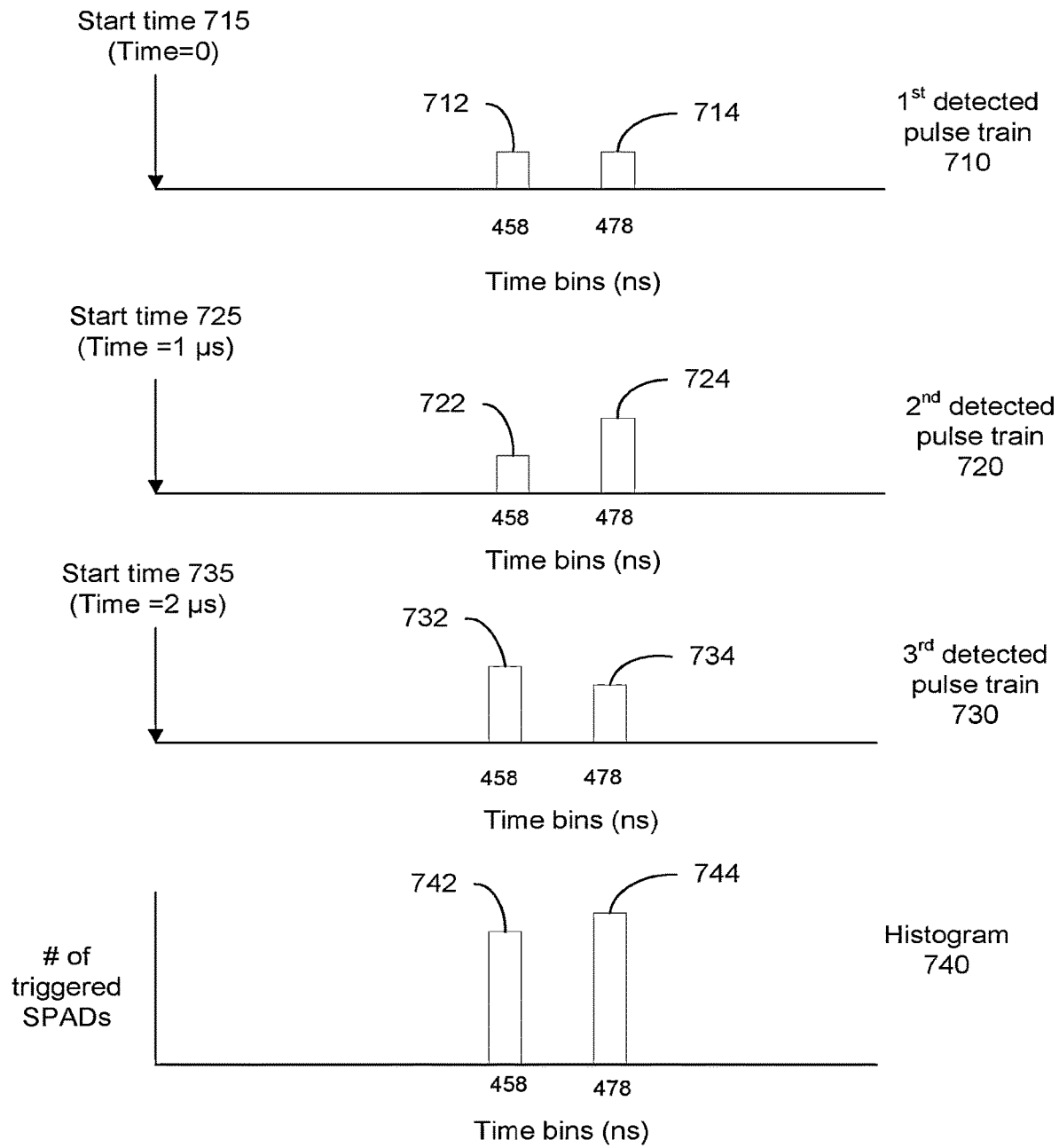
FIG. 7 shows the accumulation of a histogram over multiple pulse trains for a selected pixel according to embodiments of the present disclosure.

FIG. 7 shows the accumulation of a histogram over multiple pulse trains for a selected pixel according to embodiments of the present invention. FIG. 7 shows three detected pulse trains 710, 720 and 730. Each detected pulse train corresponds to a transmitted pulse train that has a same pattern of two pulses separated by a same amount of time. Thus, each detected pulse train has a same pulse pattern, as shown by two time bins having an appreciable value. Counters for other time bins are not shown for ease of illustration, although the other time bins may have relatively low non-zero values.

In the first detected pulse train 710, the counters for time bins 712 and 714 are the same. This can result from a same number of photodetectors detecting a photon during the two time bins. Or, in other embodiments, approximately the same number of photons being detected during the two time bins. In other embodiments, more than one consecutive time bin can have a consecutive non-zero value; but for ease of illustration, individual nonzero time bins have been shown.

Time bins 712 and 714 respectively occur 458 ns and 478 ns after start time 715. The displayed counters for the other detected pulse trains occur at the same time bins relative to their respective start times. In this example, start time 715 is identified as occurring at time 0, but the actual time is arbitrary. The first detection interval for the first detected pulse train can be 1 μs. Thus, the number of time bins measured from start time 715 can be 1,000. After, this first detection interval ends, a new pulse train can be transmitted and detected. The start and end of the different time bins can be controlled by a clock signal, which can be part circuitry that acts as a time-to-digital converter (TDC), e.g., as is described in FIG. 5.

For the second detected pulse train 720, the start time 725 is at 1 μs, e.g., at which the second pulse train can be emitted. Such a separate detection interval can occur so that any pulses transmitted at the beginning of the first detection interval would have already been detected, and thus not cause confusion for pulses detected in the second time interval. For example, if there is not extra time between shots, then the circuitry could confuse a retroreflective stop sign at 200 m with a much less reflective object at 50 m (assuming a shot period of about 1 us). The two detection time intervals for pulse trains 710 and 720 can be the same length and have the same relationship to the respective start time. Time bins 722 and 724 occur at the same relative times of 458 ns and 478 ns as time bin 712 and 714. Thus, when the accumulation step occurs, the corresponding counters can be added. For instance, the counter values at time bin 712 and 722 can be added together.

For the third detected pulse train 730, the start time 735 is at 2 μs, e.g., in which the third pulse train can be emitted. Time bin 732 and 734 also occur at 458 ns and 478 ns relative to its respective start time 735. The counters at different time bins may have different values even though the emitted pulses have a same power, e.g., due to the stochastic nature of the scattering process of light pulses off of objects.

Histogram 740 shows an accumulation of the counters from three detected pulse trains at time bins 742 and 744, which also correspond to 458 ns and 478 ns. Histogram 740 could have less number of time bins that are measured during the respective detection intervals, e.g., as a result of dropping time bins in the beginning or the end, or that have values less than a threshold. In some implementations, about 10-30 time bins can have appreciable values, depending on the pattern for a pulse train.

As examples, the number of pulse trains emitted during a measurement to create a single histogram can be around 1-40 (e.g., 24), but can also be much higher, e.g., 50, 100, or 500. Once a measurement is completed, the counters for the histogram can be reset, and a set of pulse trains can be emitted to perform a new measurement. In various embodiments and depending on the number of detection intervals in the respective duration, measurements can be performed every 25, 50, 100, or 500 μs. In some embodiments, measurement intervals can overlap, e.g., so a given histogram corresponds to a particular sliding window of pulse trains. In such an example, memory can exist for storing multiple histograms, each corresponding to a different time window. Any weights applied to the detected pulses can be the same for each histogram, or such weights could be independently controlled.

IV. Generating Lidar (Depth) Images

A depth image (or lidar image or frame) can be generated from the set of histograms corresponding to different pixel sensors, potentially taken at different times. For example, the staggered array 510 of FIG. 5 may be used to obtain a set of histograms for one measurement; the array can be scanned (e.g., moved linearly or rotated), and then a new set of measurements can be taken. Each histogram for a given pixel sensor can be used to determine a depth value for a pixel in a lidar image (e.g., a rectilinear array of pixels covering 360°).

To determine a lidar image, a match filter can be applied to each histogram to determine a depth value. The depth value (and potentially peak/signal value and noise value) can be assigned to a particular pixel in a rectilinear 2D array of the lidar image. The assignments can be made based on position in the array and an angular position of rotation. Further details for generating lidar images is provided below.

A. Match Filtering and Peak Detection

As mentioned above, matched filters can be used to determine a temporal location (received time) of a detected pulse. The received time can then be used to determine the total time of flight of the pulse, which can then be translated to a distance.

Figure 8:
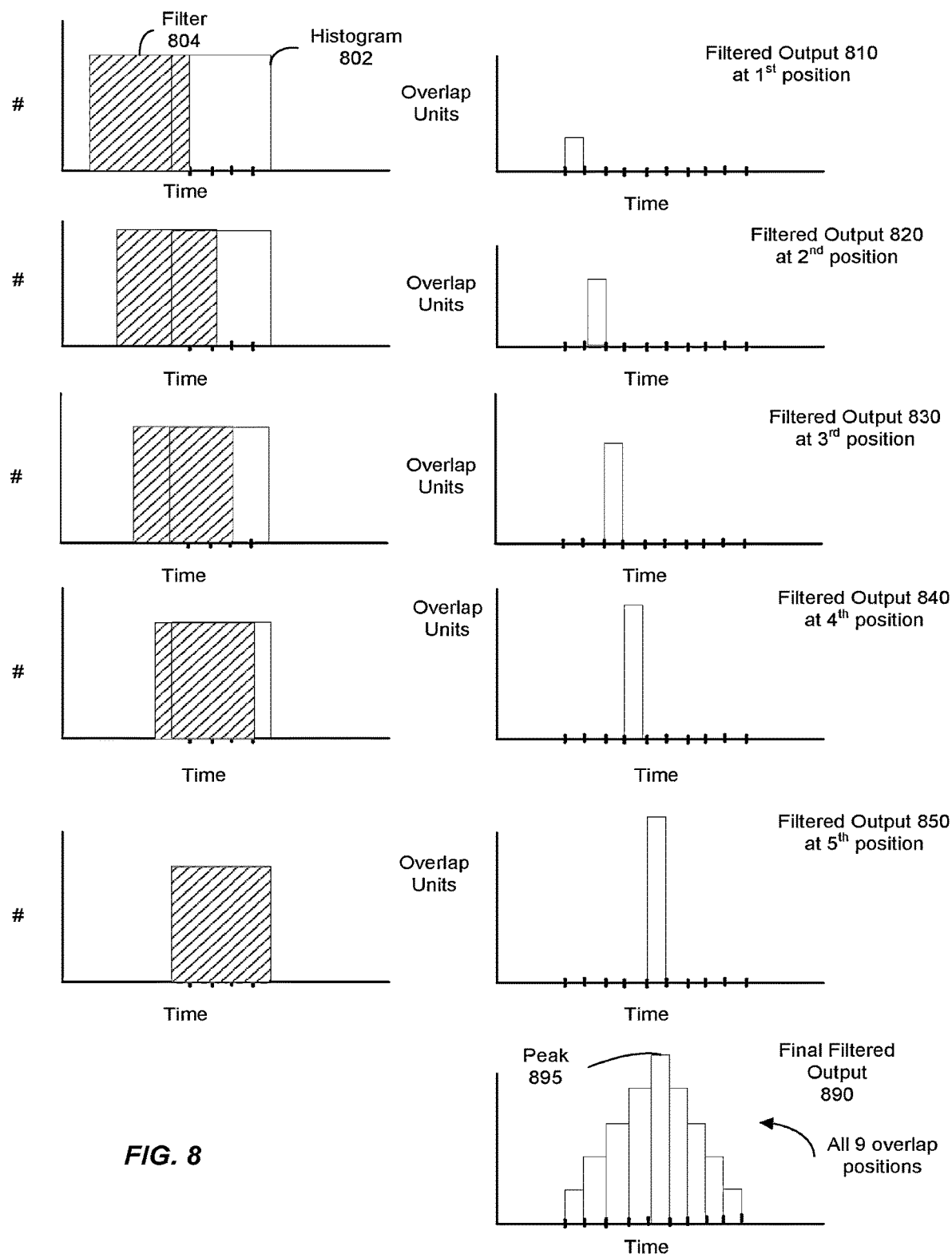
FIG. 8 shows a series of positions for applying a matched filter to a raw histogram according to embodiments of the present disclosure.

FIG. 8 shows a series of positions for applying a matched filter to a raw histogram according to embodiments of the present disclosure. The series of positions can be considered sliding positions as the filter is slid (moved) across the raw histogram. Raw histogram 802 depicts a relatively small time window around a detected pulse for a single pixel. Filter 804 corresponds to the shape of the digitized pulse. Both histogram 802 and filter 804 have an idealized shape for ease of presentation. The series of plots on the left side of FIG. 8 show different positions of filter 804 relative to histogram 802. Filter 804 is shifted by one time bin in each consecutive plot.

The filtered outputs resulting from the application of filter 804 to histogram 802 are displayed on the right side of FIG. 8. The bar charts show the level of overlap between filter 804 and histogram 802 at each position. Filtered output 810 corresponds to the first position where the overlap between filter 804 and histogram 802 is only one time bin. The vertical axis of filtered output 810 is in arbitrary units of the amount of overlap, e.g., a sum of the multiplication product of the corresponding values of filter 804 and histogram 802. The value of filtered output 810 is shown at a time bin that corresponds to the center of filter 804. This can be done when the center of the pulse is to be detected. In other embodiments, the value of the filtered output can be shown at a time that corresponds to the leftmost bin of the filter. This can be done when the rising edge of the pulse is to be detected. The values for the center and the rising edge can be derived from the other. It can be easier to define the location of the first filter tap (basically the rising edge), e.g., when the pulses in a pulse train are different widths. The different widths may result from different transmitted widths or due to the detected intensity being different.

Filtered output 820 corresponds to a second position where the overlap is two time bins, and thus resulting value is twice as much as in filtered output 810. The value is shown displayed a different time bin then filtered output 810 as filter 804 has been shifted by one time bin to the right. Filtered output 830 correspond to a third position where the overlap is three time bins. Filtered output 840 corresponds to a fourth position where the overlap is four time bins. Filtered output 850 corresponds to a safe position where the overlap is five time bins. As is readily seen, the fifth position is a highest as a corresponds to a perfect overlap between filter 804 and histogram 802.

Final filtered output 890 shows the values at each of the 9 positions that have some level of overlap between filter 804 and histogram 802. Such a filtered output can be analyzed to identify a maximum value as corresponding to a received time of the detected pulse. In various implementations, this time can be directly recorded or modified (e.g., identify where a leading edge would be) as part of a time-of-flight measurement.

A maximum value in the filtered output 890 (also referred to as a filtered histogram) can be identified as peak 895 (also referred to as a peak value or signal value). The time bin of peak 895 corresponds to the detected time of the received pulse. In some embodiments, interpolation filters can be used to determine finer resolutions than the width of a time bin. This detected time can correspond to a distance (depth value) based on when the pulse train is emitted.

B. Assigning Depth Values to Depth Images

The depth values determined from the histograms can be organized into a lidar image, e.g., full 360 degree panoramic lidar image. As mentioned above, a lidar device can rotate, with measurements being obtained at specified angular positions. The depth values at different angular positions can be aggregated to provide the lidar image. The aggregation (assignment) of the depth values can account for the specific location of each photosensor and when (e.g., angular position) the measurement, resulting in the depth value, was obtained.

Figure 9:
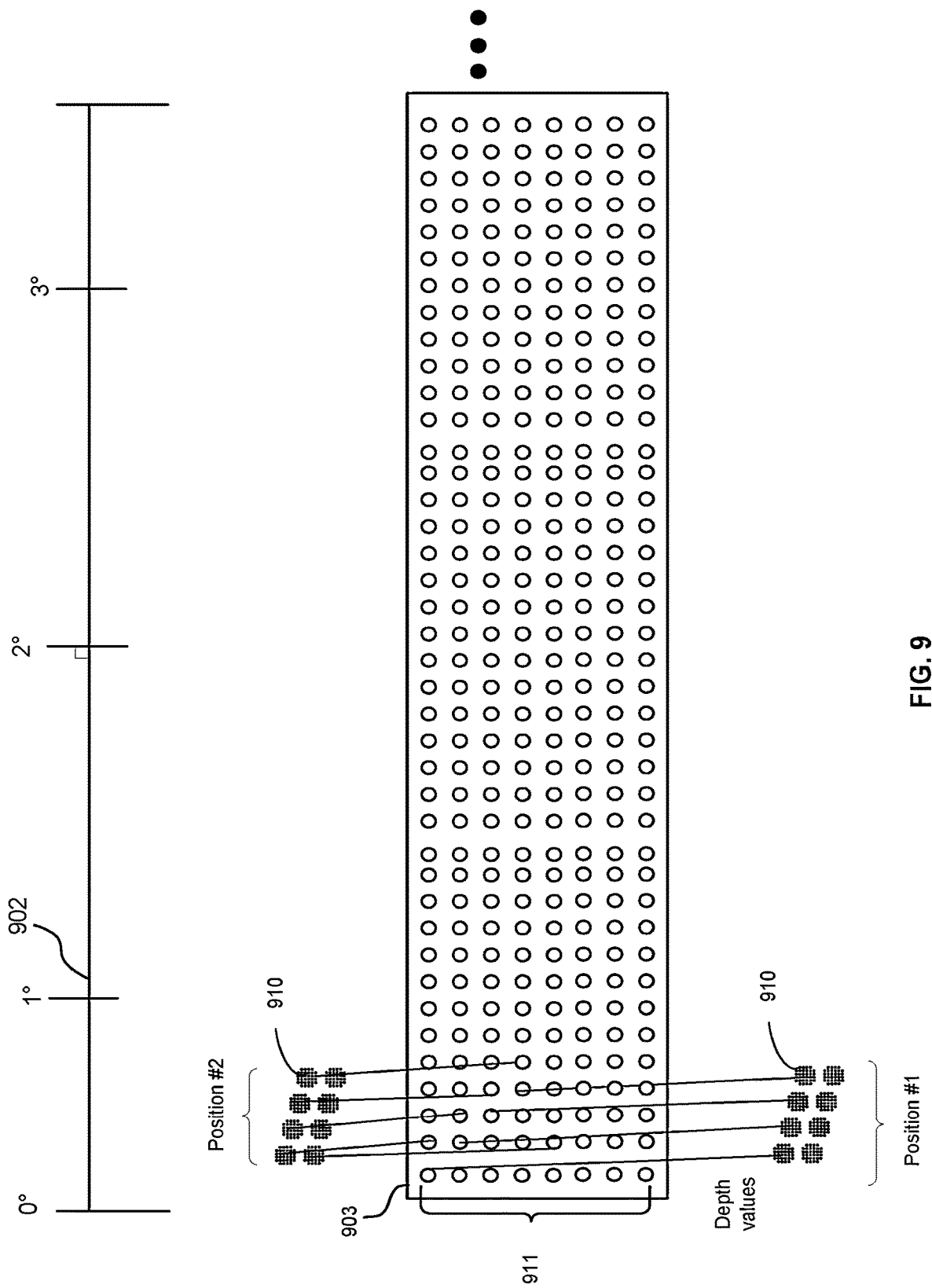
FIG. 9 illustrates a panoramic lidar image to which depth values from pixel sensors have been assigned according to embodiments of the present disclosure.

FIG. 9 illustrates a panoramic LIDAR image 903 to which depth values from pixel sensors have been assigned according to embodiments of the present disclosure. Depth values from pixel sensors 910a are assigned to depth pixels 911 (also referred to as lidar pixels) in lidar image 903. FIG. 9 shows the assignment of some of the pixel sensors 910 for two angular positions of the lidar device An angular positions can be generated by a rotary encoder. The assignment of measurements from a given pixel sensor at a given position can use a mapping (assignment) table or function, which may be hardcoded or exist in memory. One example of assignment is provided below.

The top horizontal axis 902 delineates the orientation angle (angular position) of a scanning lidar device. As shown, there are seven angular positions between 0° and 1°. The staggered pixel sensors are shifted to the right by an angular position corresponding to one column in the lidar image. The measurement interval may span a range of angular positions.

For the sake of simplicity, it is assumed that light sensing module (e.g., 230 of FIG. 2) has a 2×4 staggered array of pixel sensors, each of which may be composed of multiple photodetectors. The measurements of the 8 pixel sensors provide an image with 8 rows and a number of columns corresponding to the number of angular positions. Assuming 7 angular positions for every degree the horizontal resolution would be 2,520. Other arrays of pixel sensors and frequency of measurements at angular positions would provide other vertical and horizontal resolutions, respectively.

In the example shown, the assignments are as follows. At angular position #1, the pixel sensor at the top left of the staggered array is assigned to the depth pixel at the top left. The top pixel in the second column is assigned to the pixel in the second row and second column (position 2:2). After movement to position #2, the top-left pixel sensor would move to the depth pixel 1:2, since it is at a top vertical position, but now at the second column.

The depth pixel at 2:1 will be assigned once the lidar device is at the final position, e.g., position 2,520, as the top pixel sensor in the second column will align to the first column in the lidar image.

As mentioned above, different mappings (assignments) can be used. For example, the data can stream in sequentially from the sensors array in a particular order or with identifiers that indicate which data corresponds to which pixel sensor and at which position. The data can be rearranged in a memory buffer as a rectilinear image according to the true spatial relationship of the data (e.g., as defined by a mapping table) so that the image can be processed efficiently as an image. Accordingly, various techniques can be used to reconstruct a lidar image in memory that is derived from a streaming source of data.

The depth values of the resulting lidar image can be filtered and processed to increase accuracy, correct for missing information or noisy data, and the like. The spatial relationship of the depth pixels correspond to the spatial relationship of the photosensors at specified positions. These spatial relationships can be used in processing the lidar image, e.g., in how a filter kernel is used as well as by an AI co-processor, which may use machine learning to classify a group of depth pixels as corresponding to a same object.

C. Color and Depth

Besides measuring depth, embodiments can measure color of ambient light. Such color sensors can be on a same sensor. Various wavelengths of ambient light can be measured, including those in or out of the visible spectrum. Herein, the term color should be interpreted broadly to cover any range of wavelengths. Other measurements of optical properties besides color can also be used, e.g., polarimetric data, such as near birefringence, circular birefringence (also known as optical rotation or optical rotary dispersion), linear dichroism, and circular dichroism. Color is used as just one example, and the description for color can also apply for other measurements of optical properties.

Figure 10:
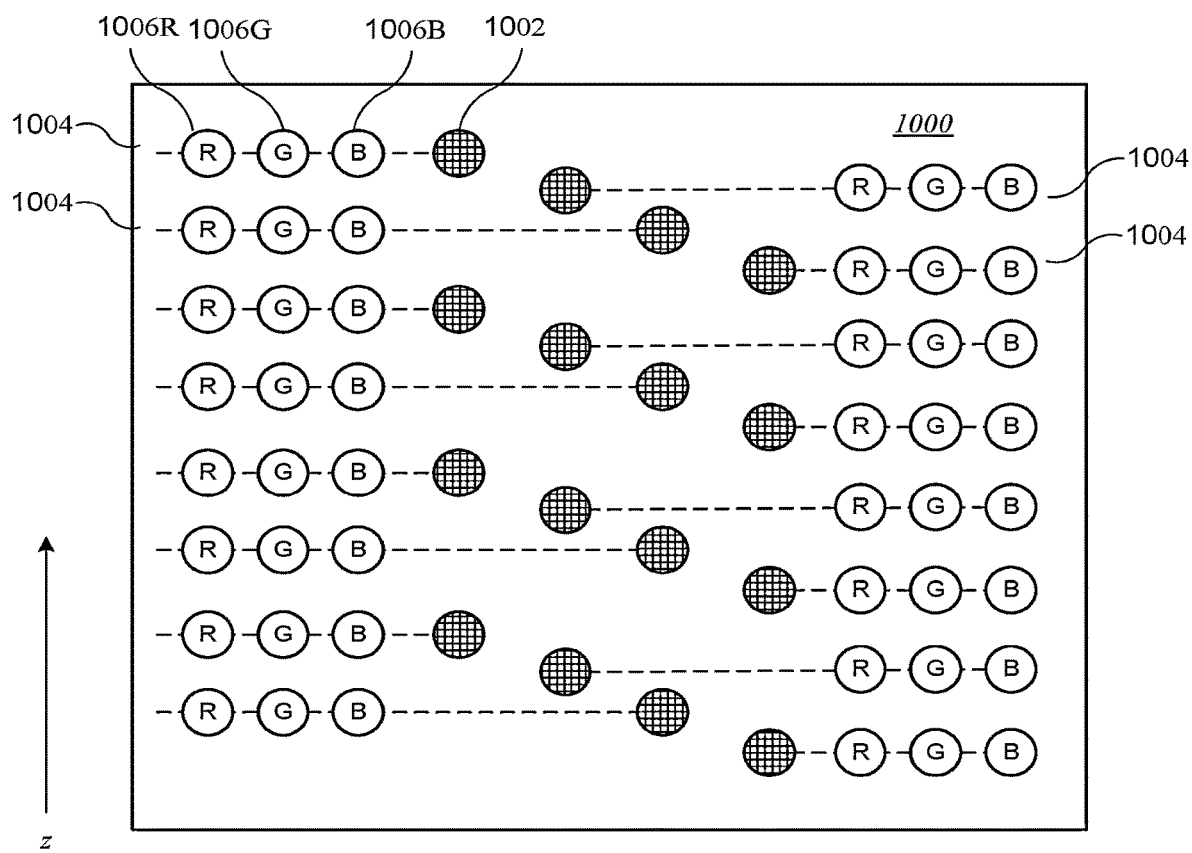
FIG. 10 shows a simplified front view of a sensor array according to an embodiment of the present invention.

FIG. 10 shows a simplified front view of a sensor array 1000 according to an embodiment of the present invention. Sensor array 1000 can include a number of lidar sensor 1002; this example shows sixteen lidar sensors 1002, but any number of lidar sensors 202 can be included. In this example, lidar sensors 1002 are arranged in a staggered fashion; however, this is not required, and in some embodiments, lidar sensors 1002 can be arranged in a single column (in this example, columns run parallel to the z axis shown at the left side of FIG. 10).

In this example, each lidar sensor 1002 is associated with a "row" 1004 of sensor array 1000. (The term "row" here is used to indicate a linear or approximately linear arrangement of elements; rows in FIG. 10 are indicated by dashed lines.) In addition to a lidar sensor 1002, each row of sensor array 1000 includes one or more ambient-light sensors 1006. In this example, ambient-light sensors 1006R detect red light, ambient-light sensors 1006G detect green light, and ambient-light sensors 1006B detect blue light; however, any number and combination of ambient-light sensors can be used. Additional examples are described below. Each row can include a complete set of sensors for generating a multi spectral pixel. Sensor arrays such as sensor array 1000 are referred to herein as "row-based" or "1D" sensor arrays.

Other examples can have a complete set of sensors in a 2D array as opposed to being in a single row. Such a 2D array could occur when movement of the lidar device is in more than one direction. Regardless of the sensor arrangement, the different types of optical data can be captured at every location. Additionally, some of the data could come from a completely different sensor system that is spatially calibrated to the main lidar sensor, so that the measured data for a location can be mapped to a particular pixel in an image. Thus, the data can be streamed into an image buffer at different times. The image processing can wait until the buffered image is fully reconstructed, with all data layers filled in the buffer for all the pixels in an area of the image, before that part of the image is processed.

The lidar and ambient-light sensors can be assigned in a similar manner as in FIG. 9. But, the ambient-light sensors can be assigned to color images, and the lidar sensors assigned to lidar images. Thus, a color pixel can be correlated to a lidar pixel based on the sensors being in a same row or using a mapping table.

D. Forming Reproducible Rectilinear Grid of Pixels in Lidar Images

As described above, an array of sensors may be used to generate a rectilinear grid of pixels, even when the array includes multiple columns and the sensor array moves among various positions to generate the images.

In some embodiments, sensor arrays of the kind described above may be used in an angular scanning or rotating mode such that different sensor channels in a row of a sensor array successively image (i.e., sense photons from) a particular region in the field of view. For purposes of this description, it is assumed that, during a scanning operation, the sensor system rotates about an axis that is transverse to the rows and that the sensor channels are operated as the sensor system rotates through different angles. (It should be understood that scanning behavior described herein can also be achieved without moving the sensor array, e.g., by using a MEMS mirror to reflect light from different areas of object space onto the array at different times.) It is also assumed that the sensor array and a bulk optical module are held in fixed relation to each other in the sensor system, so that a given sensor channel has a fixed spatial relationship to the optical axis of the bulk imaging optic and "sees" through the same portion of the bulk optical module, regardless of orientation of the system in space.

To simplify image analysis, it is generally desirable that a scanning sensor system uniformly samples the object space. In this context, the grid of object-space pixels is considered to be arranged with rows along the scanning direction and columns in the direction transverse to the scanning direction. In the scanning direction, it is desirable that different sensor channels in the same row (e.g., all sensor channels in the same row 1004 of sensor array 1002 of FIG. 10) sample the same object-space pixel (at somewhat different times) as the sensor array rotates. This can be achieved in part by coordinating sampling intervals with the rotation of the sensor array, as described below. However, it is also important to avoid pointing error due to differences in the locations of different sensor channels relative to the optical axis of the bulk optical module. Accordingly, in some embodiments, the bulk optical module used with a sensor array in a scanning sensor system is designed to provide uniform sampling in both the scanning and non-scanning directions.

Figure 11A:
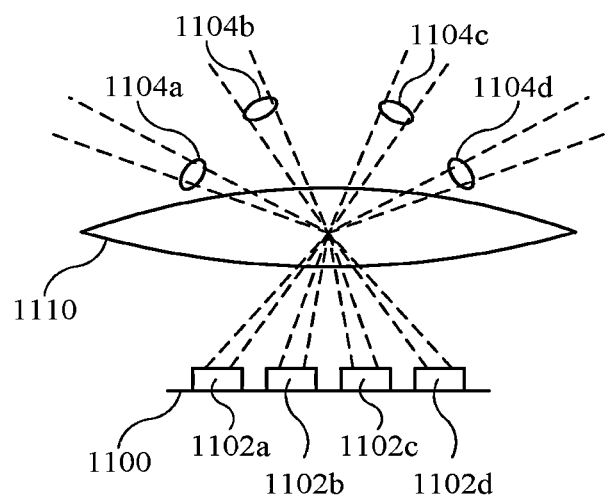
FIGS. 11A and 11B are simplified conceptual illustrations showing the potential for pointing error in a scanning system using a sensor array.
Figure 11B:
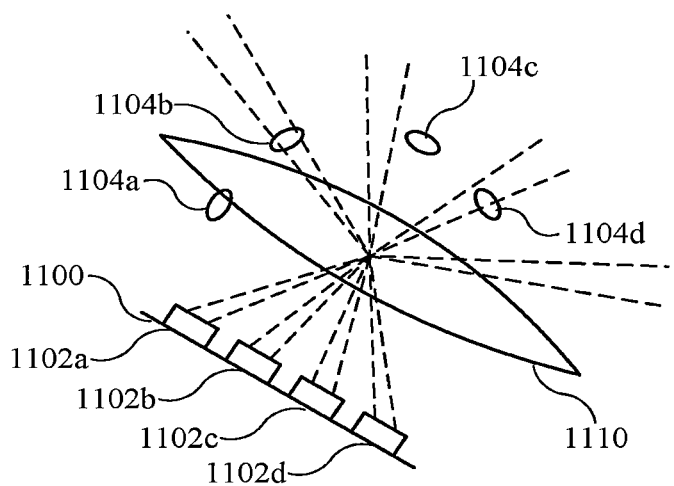

FIGS. 11A and 11B are simplified conceptual illustrations showing the potential for pointing error in a scanning system using a sensor array.

FIG. 11A shows a row of a sensor array 1100 that has uniformly spaced sensor channels 1102a-1102d, which may correspond, e.g., to sensor channels in a row 1004 of sensor array 1000 of FIG. 10. Each sensor channel has a channel field of view through a bulk optic 1110, as indicated by dashed lines. Uniformly-spaced object space pixels, indicated by ovals 1104a-1104d, align with the channel fields of view of sensor channels 1102a-1102d.

FIG. 11B shows sensor array 1100 after rotating through an angle such that sensor channel 1102a points approximately at object-space pixel 1104b. Sensor channel 1102b points to the left of object-space pixel 1104c, and sensor channel 1102c points approximately at object-space pixel 1104d.

As can be seen in FIG. 11B, there is pointing error. For instance, the field of view of sensor channel 1102b does not point at object-space pixel 1104c, and the field of view of sensor channel 1102c does not precisely align with object-space pixel 1104d. The term "intrapixel pointing error" is used herein to refer to differences in the field of view between sensor channels that are nominally pointed at the same object-space pixel. (These differences are "intrapixel" with respect to object-space pixels.) In some embodiments, controlling intrapixel pointing error is desirable when gathering multispectral pixel data.

In addition to intrapixel pointing error, a sensor system may have "interpixel pointing error," which refers to non-uniform spacing between object-space pixels in either the row (scanning) direction or the column (non-scanning) direction. In a scanning sensor system, uniformity of pixel spacing in the scanning direction can be achieved by controlling the shutter intervals relative to the rotation angle of the sensor system (e.g., as described below) and by limiting the intrapixel pointing error, or by having independent shutter control on each pixel to eliminate intrapixel error completely. In the non-scanning direction, it is desirable that the object-space pixels along a column are uniformly spaced and that columns in object space map to columns in image space. In this connection, it should also be noted that some sensor arrays (e.g., sensor array 1000) may include a set of staggered sensors (e.g., lidar sensors 1002). In this case, a single column of object-space pixels can be imaged by scanning the array and controlling the shutter intervals to create a column alignment. For example, in the case of sensor array 1000, a column of the image can have sixteen pixels, even though the sixteen sensor channels 1002 are not aligned in a column on sensor array 1000, as described above. In implementations that do not have such alignment or have some alignment errors, the lidar system can identify the nearest integer rectilinear pixel coordinates for storing in an image buffer. In some examples, the pointing error can be quantified and saved, and used for later corrections, e.g., via interpolation or regression using the measured values (e.g., depth, color, etc.) and a pointing error from the rectilinear pixel coordinates.

The desired imaging behavior is achieved in some embodiments by providing a bulk optic module that has a focal length distortion profile in which displacement of a light ray is linear with changes in the tangent of the angle of incidence ($\theta$) of the ray. Lenses (or lens systems) with this type of focal length distortion profile are commonly referred to as "F tan $\theta$" lenses (signifying that the displacement distance at the image plane is a linear function of tan $\theta$), or "flat field" lenses. For small angles $\theta$, an F tan $\theta$ lens has the property that the displacement of a light ray on the image plane (i.e., the sensor array) is approximately linear with changes in the angle of incidence ($\theta$) of the ray. In the scanning direction, this provides the desired behavior of reducing intrapixel pointing error. In the non-scanning direction, this provides uniform sampling in object space and also allows columns of object-space pixels to map to columns of image-space pixels, even if the sensors are arranged in a staggered fashion.

Figure 12:
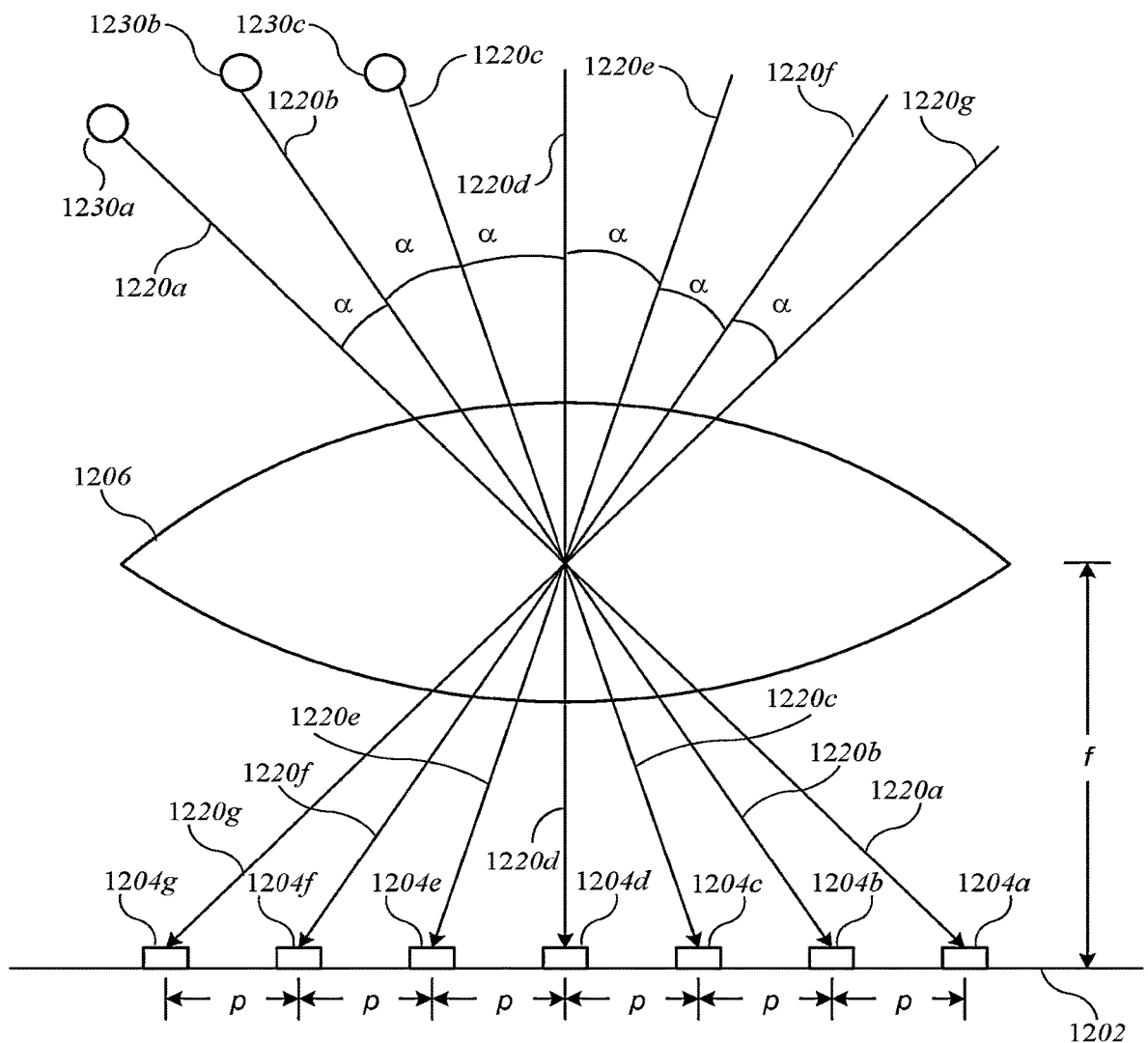
FIG. 12 illustrates an example of an imaging system using an F tan θ bulk optic module according to embodiments of the present disclosure.

FIG. 12 illustrates an example of an imaging system using an F tan $\theta$ bulk optic module according to embodiments of the present disclosure. Image plane 1202 includes a row of sensors 1204a-g separated by a uniform distance p (also referred to herein as the "linear pitch"). Sensors 1204a-g can be, for example, a row (or a portion of a row) of sensor channels in any of the multispectral sensor arrays described above, or other sensors that detect photons from a given direction. A bulk optic module 1206 is positioned at a distance f above image plane 1202, where f is the focal length of bulk optic module 1206. In this example, bulk optic module 1206 is represented as a single bi-convex lens; however, it should be understood that other lenses or multi-lens systems may be used.

Bulk optic module 1206 can be designed to focus light from a field of view (or object space) onto image plane 1202. For instance, rays 1220a-1220g indicate chief rays for sensors 1204a-1204g. (It should be understood that the actual path of light through bulk optic module 1206 is not shown.)

Bulk optic module 1206 has a F tan $\theta$ focal-length distortion profile. (Those skilled in the art will understand how to create bulk optic modules that have this profile, and a detailed explanation is omitted.) As a result, at least for small angles, a uniform change in the angle of incidence of a light ray results in shifting the point where the refracted light ray intersects the image plane by a uniform distance, independently of the original angle of incidence. For instance, for rays 1220a, 1220b, the difference in angle of incidence is a, and rays 1220a, 1220b are separated at the image plane by the linear pitch p. Rays 1220b, 1220c also have a difference in angle of incidence of a, and the corresponding refracted rays 1220b, 1220c are also separated at the image plane by the linear pitch p. Thus, if image plane 1202 and bulk optic module 1206 are together rotated through an angle α, ray 1220a originating from point 1230a would become (approximately) the chief ray for sensor 1204b while ray 1220b originating from point 1230b would become (approximately) the chief ray for sensor 1204c, and so on.

The rotation angle α that corresponds to linear pitch p at the image plane is referred to herein as the "angular pitch" of the scanning system, and the value of α is determined based on the sensor pitch p and the properties of the bulk optic module. In scanning ranging/imaging systems where the bulk optic module provides an angular pitch α such that scanning the system through the angle α results in shifting the incident rays by one linear pitch unit p, different sensor channels in a row can image the same portion of the field of view by acquiring images at a sequence of time steps, where the sensor array is rotated by the angular pitch α (or through a smaller angle such that α is an integer multiple of the scanning pitch) at each time step.

E. Controller for Generating Rectilinear Lidar Frames

As described above, rectilinear lidar frames can be generated, even when multiple pixels share a same bulk optic and when the light sensing module rotates or scans by other means. Accordingly, images of depth pixels can be generated from histograms and assigned to a pixel in a rectilinear array. The relative position of the lidar pixels can thus form a pattern such that image processing techniques can be applied. In contrast, lidar data is typically formed as independent points clouds that are not consistently structured when stored in a frame buffer.

Figure 13:
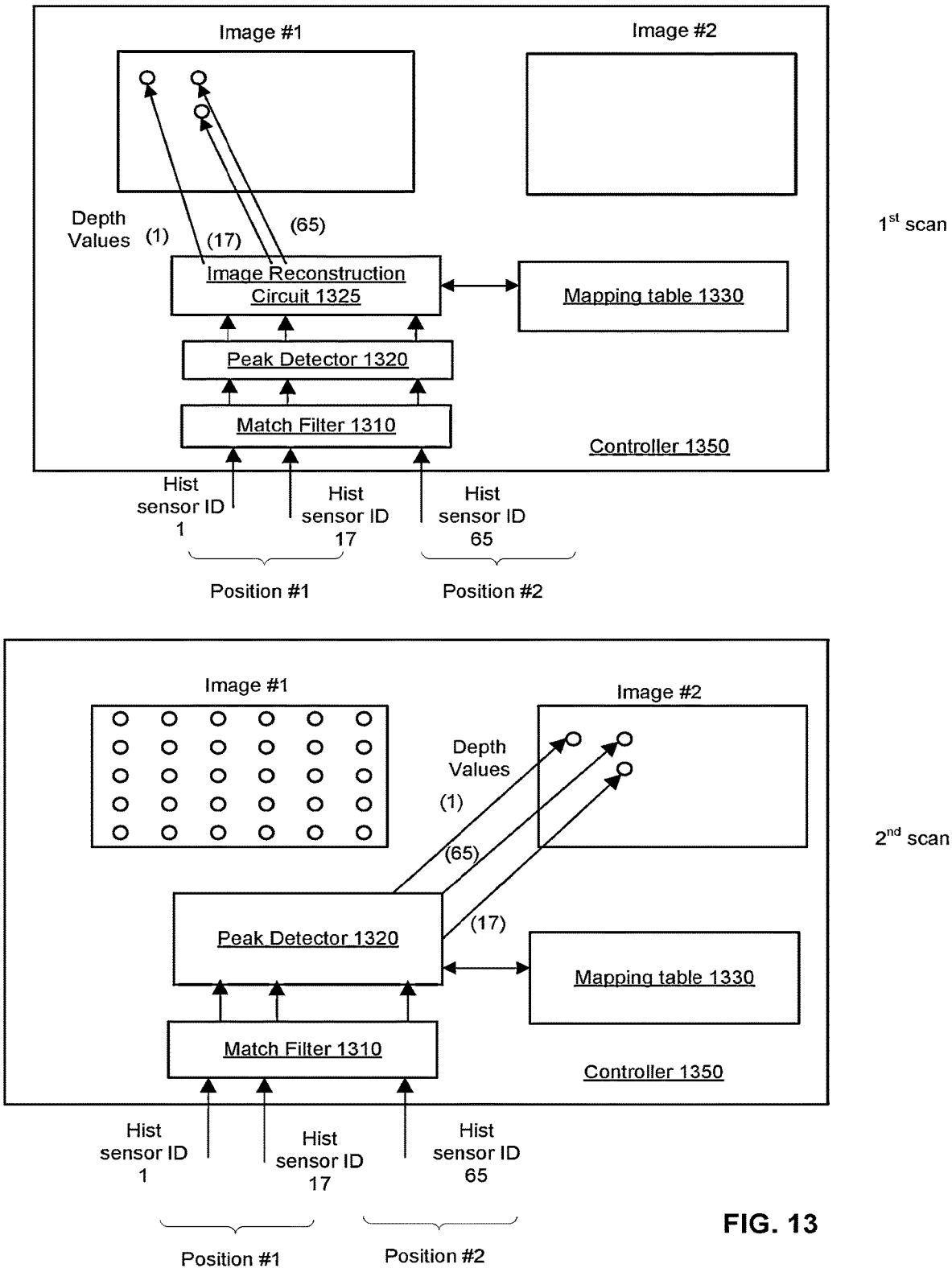
FIG. 13 shows a controller configured to identify signals in histograms and form rectilinear arrays of depth values to periodically generate lidar frames according to embodiments of the present disclosure.

FIG. 13 shows a controller 1350 configured to identify signals in histograms and form rectilinear arrays of depth values to periodically generate lidar frames according to embodiments of the present disclosure. Controller 1350 can be on a same integrated circuit or different integrated circuit than a light sensing module (e.g., 230 of FIG. 2). In other examples, one or more of the components can reside on a light sensing module. In yet other examples, different components of controller 1350 can be on different integrated circuits. Controller 1350 can perform similar or same functions as ranging system controller 250 of FIG. 2. As described below, controller 1350 can act as an image reconstruction processor.

As described above, a light sensing module (e.g., 230 of FIG. 2) can generate a histogram of photon counts detected across multiple shots during a measurement interval. During a measurement, a histogram can be generated for each sensor (e.g., 515 of FIG. 5) in a sensor array (e.g., 510 of FIG. 5) of the light sensing module. Each sensor can be assigned a particular ID. After a current measurement ends, the histograms can be sent to controller 1350. The histograms can be sent serially (e.g., the histogram for sensor ID 1 sent first, histogram for sensor ID2 sent second, and so on) or in batches, e.g., all in parallel.

The histograms can be sent as part of a data structure that includes the sensor ID. In another example, histograms can be sent in a specified order such that the location of the histogram in the data stream can indicate the sensor ID (e.g., a histogram length N can be known, so that the next time bin of data (N+1) can correspond to a next sensor ID). The assignment of sensor IDs can then start back at one, when reconstruction of a new image begins. Accordingly, a detection circuit (e.g., all or part of a light sensing module) can provide the depth values in a specified order, and the image reconstruction circuit can assign the sensor ID for a particular depth value based on the specified order.

The histograms can be provided to a match filter 1310, which can apply a filter to provide a filtered histogram, as shown in FIG. 8. Various match filters may be used to provide various filtered histograms, e.g., to detect different shapes of detected pulses. The filtered histograms can be provided to a peak detector 1320. In some examples, match filter 1310 and some or all of peak detector 1320 can be part of ranging circuitry.

Peak detector 1320 can analyze the filtered output and determine the location (e.g., time bin or greater resolution) corresponding to the peak. These range (depth) values can then be used to form an image, e.g., for a current scan of the lidar device. A first image is shown being filled. The first image can reside in one buffer. Once the buffer is filled or at least a specified portion of the buffer (e.g., a subset of pixels corresponding to a kernel size of a co-processor), the frame can be sent to one or more co-processors for further analysis. The frame buffer can be a memory bank operating as a FIFO. Accordingly, an image reconstruction circuit can determine when a specified subset of the first lidar pixels have been stored for the first lidar image and send the specified subset of the first lidar pixels to a kernel-based coprocessor.

Peak detector 1320 can also measure a signal value and a noise value, effectively providing some signal to noise measurement for a lidar pixel. A signal value can correspond to the number of photon counts at a peak in the histogram, and a noise value can correspond to a background level in time bins outside of a peak region. In various embodiments, the amount of light at the operating wavelength (e.g., of the emitted light source) can be used to estimate noise, or other wavelengths can be used. Thus, a lidar pixel can include a range (depth) value, a signal value, and a noise value. A signal value corresponds to an amount of light reflected from an object in the scene. A noise value corresponds to a measure of ambient light level in the scene at the same wavelength as the lidar system operates.

In other embodiments, the match filter can measure noise and provide some signal to noise measurement to the peak detector, which uses the information to detect the range of the signal. In some instances, the peak detector may determine that the signal is not sufficiently strong, and thus omit the lidar pixel from the image, e.g., by providing a NULL value to store in the image. In other instances, the values are stored initially so that later stages of the pipeline can determine whether to provide a particular depth value for a given pixel to a user.

A position (e.g., an angular position) of the light sending module can also be received, where each position corresponds to a different measurement using the sensory array of the light sensing module. A scan (e.g., a revolution) is composed of a series of measurements over a set of positions. In various examples, the position can be received by controller at a start of a new measurement, may be received from the light sensing module, received from a different module (e.g., an encoding module), or with the histograms, as well as suitable combinations of these options.

For a given measurement, multiple pixel sensors can each provide a histogram. Along with the histogram data, the pixel sensors can provide a pixel ID that identifies a particular sensor on the sensor circuit. The pixel ID can be used to determine which pixel in an image to populate with a given depth value determined from a corresponding histogram. The assignment of the data to a pixel can use a lookup table with the pixel mapping into the rectilinear frame buffer, as is described herein. The assignment of the data to a pixel can be performed using an image reconstruction circuit 1325, which can be separate from or part of peak detector

1320 and can be part of ranging circuitry. As described above, a detection circuit can provide the sensor ID for each of the depth values to an image reconstruction circuit.

A mapping table 1330 can specify which pixel IDs correspond to which pixels in a lidar image. Mapping table 1330 can identify a corresponding pixel in an image to populate with a given depth value based on the sensor ID and a current position of the light sensing device (module). Once the light sensing device moves to a new position, controller 1350 can provide new assignments for the next set of histograms that are to be provided. For example, the assignments can be loaded from mapping table 1330 to the peak detector. The mapping can be performed in a similar manner as shown in FIG. 9. For example, each row of the mapping table can have a column for the sensor ID and another column that specifies the lidar pixel, e.g., a 2D coordinate, which may be specified as X, Y.

As shown for the first scan, match filter 1310 receives histograms, each corresponding to a particular pixel. The pixel can be determined using a pixel ID, e.g., a number specifying which sensor in an array was used to generate the histogram. In some embodiments, it is possible for the controller to assign a pixel ID based on an order that the histograms are received in a data stream from the light sensing device. For example, controller 1350 can track when a new image is started, e.g., based on an old image buffer being full or based on measurements received from the light sensing device, e.g., rotary encoder positions. The first histogram would correspond to pixel ID #1. The correspondence of the next N-1 histograms can be known based on the light sensing device outputting the histograms in a specified order.

For an example where the sensor array has 64 sensors, the second angular position would have a range of sensor IDs from 65-128. For a mapping similar to FIG. 9, sensor ID 65 would be the first (top) pixel, but shift one column to the right (or left if rotation was counter-clockwise), as is shown. If the sensor array has four columns of 16 sensors, then sensor ID 17 corresponds to the pixel in the second row of the second column, as the sensor array is staggered. Various mappings can be used depending on the shape of the sensor array.

In some implementations, once the first image is completed (reconstructed), it can be output, as described in more detail below. Controller 1350 can determine when the first image is completed based on knowledge of the image buffer size and/or a signal from the image buffer indicating it is full. In other embodiments, controller 1350 can receive a signal that the light sensing device has made a rotation, e.g., based on measurements made by a rotary encoder. Such measurements can occur on the light sensing device, the controller 1350, or other component of the system. In other implementations, the first image can be output in portions. For example, when one portion is completed, that portion can be output while depth values have yet to be assigned to other portions of the first image. In such implementations, certain processing techniques (e.g., local kernel) can start processing the first image even if only one portion is fully reconstructed in memory. Such local processing can reduce memory requirements and latency. However, when the system waits for the entire image to be complete, processing techniques (e.g., certain machine learning models) can be used. In some examples, some initial local processing can be performed, and then full image processing can be performed after the initial local processing.

As shown, a similar mapping is applied to sensor IDs for the second revolution as for the first revolution. In some embodiments, two buffers can be used, with the image of one buffer being sent once full, and the control immediately filling the other buffer with the next image, so that the transmission of the first buffer does not have to be completed before generation of the next image can begin.

The color images can be generated in a similar manner, except that the pixel values can be taken as the sensor value directly, as opposed to using a histogram of data values. For the example of FIG. 10, three color images can be generated, each with a same resolution as the lidar images. The lidar and color images can be analyzed together or independently.

The controller 1350 can pass buffered lidar images to a coprocessor (e.g., a lidar image processor or an AI coprocessor), which can analyze the images can send back an improved lidar image (e.g., filtered) or characterization data, such as a classification of certain lidar pixels belonging to a same object. The coprocessor(s) can be programmed to perform various functions, e.g., for filtering and semantic classification. The improved lidar image and the characterization data can be sent to the user. Examples using lidar image processor or an AI coprocessor are described below.

Accordingly, a system can include a light ranging device (e.g., 210 in FIG. 2), which can be a scanning device that moves and performs measurements at a plurality of positions, where the measurements for a scan (e.g., a revolution of 360°) can be combined to create an image. The light ranging device can include a transmission circuit (e.g., 240 of FIG. 2), which can comprise a plurality of light sources that emit light pulses, and a detection circuit (e.g., 230 of FIG. 2), which can comprise an array of photosensors that detect reflected light pulses and output signals measured over time.

A signal processor (e.g., processor 238 of FIG. 2 and/or match filter 1310 and peak detector 1320) can determine depth values from measurements using the array of photosensors. An image reconstruction circuit (e.g., 1325) can assign a sensor ID to each of depth values for a scan of the scanning light ranging device and construct a lidar image using the depth values. For example, the mapping table 1330 can be accessed using the sensor IDs to map the depth values to lidar pixels in the lidar image, where the mapping table specifies a lidar pixel based on a corresponding sensor ID. Then, after the lidar pixels of the lidar image are stored in a local image buffer, the lidar pixels of a local frame (portion of an image) or of a complete frame (entire image) can be sent to a kernel-based coprocessor, which can be on a same or different integrated circuit.

As described below, the kernel-based coprocessor can include a classifier circuit communicably coupled with the light ranging device and configured to receive lidar images output by the image reconstruction circuit, analyze the depth values in the lidar pixels of the lidar images, correlate a set of lidar pixels based on corresponding depth values of the set of lidar pixels, and output classification information of the set of lidar pixels based on the correlating.

In another example described below, the kernel-based coprocessor can include a depth imaging circuit communicably coupled with the light ranging device and configured to receive the first lidar pixels and apply one or more filter kernels to subsets of the first lidar pixels to generate filtered images of lidar pixels.

V. Applying Filter Kernels

Once a lidar image is generated, the controller can send the image to an image signal processor. As the lidar image is rectilinear, various image processing techniques can be used. The image processing can use proximity criteria (e.g., similarity in spatial location, color, contrast, etc.) to identify a subset of pixels on which to perform filtering. The similarity can be defined as two values being within a threshold difference of each other. The image signal processor can be a kernel-based processor when the processor operates on a collection of pixels.

Figure 14:
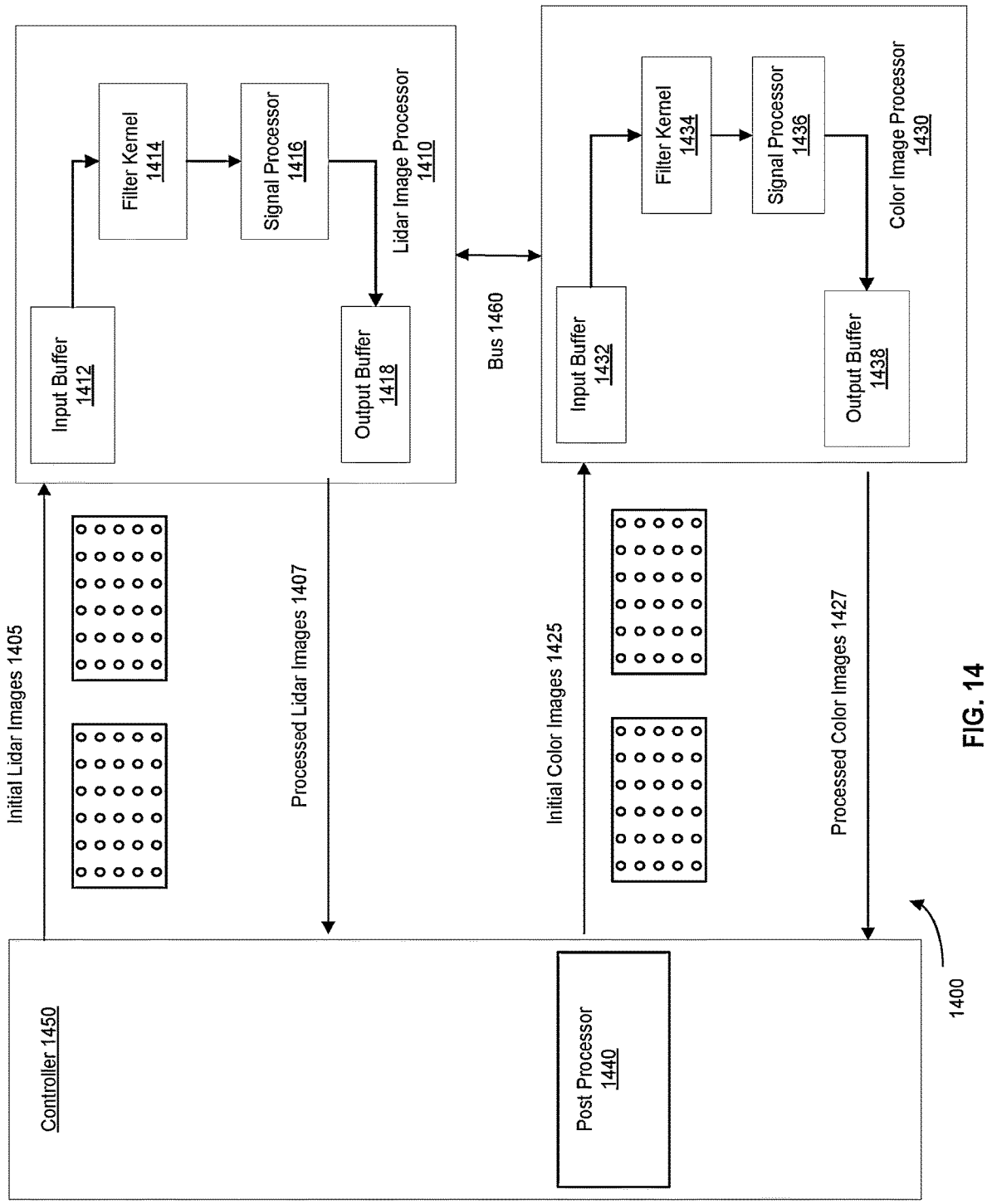
FIG. 14 shows a light ranging system including a controller and a lidar image processor according to embodiments of the present disclosure.

FIG. 14 shows a light ranging system 1400 including a controller 1450 and a lidar image processor 1410 according to embodiments of the present disclosure. Controller 1450 can correspond to other controllers described herein. Various components of light ranging system 1400 can be on a same or different integrated circuits.

Controller 1450 sends initial lidar images 1405 (e.g., images #1 and #1 in FIG. 13) to lidar image processor 1410, also referred to as a depth imaging circuit. As described above, controller 1450 can cache the histogram data that is streaming out of the sensors to determined depth values to create initial lidar images as frames of a stream of lidar images. The stream of lidar images can be provided to lidar image processor 1410 as a light sensing module scans over different positions. As shown, two lidar images are shown to illustrate the stream of lidar images that can be provided. The stream of images can be in an order generated, e.g., in an order of the positions. In some implementations, a position can be provided as part of metadata provided with a lidar image.

Accordingly, controller 1450 (or other ranging circuit) can be connected to the array of photosensors and configured to determine depth values from measurements using the array of photosensors to form a lidar image comprising a grid of lidar pixels (e.g., forming a rectilinear frame of an environment during a measurement interval), and periodically output lidar images. Each lidar image can be generated during a different measurement interval and comprise rows and columns of lidar pixels.

In lidar image processor 1410, an input buffer 1412 can cache initial lidar images 1405 before being sent one at a time or multiple images at a time to a filter kernel 1414, which may include more than one filter kernel. As the pixels of a frame have a known spatial relationship (at least laterally, i.e., in the 2D image), embodiments can perform processing that takes advantage of this known spatial relationship by performing a group function on a group of lidar pixels, e.g., a 5×5 subgroup (or other sized group) or all the lidar images in a full frame. For instance, one can use the statistics for the depth values of the group as opposed to just the single pixels. The statistical values can improve accuracy, fill in missing data, provide greater resolution, etc. Various kernels can be used, as described below. More than one kernel can be applied, and the results can be combined.

Filter kernel 1414 can provide filtered lidar images to a signal processor 1416, which may be optional or have functions that are implemented in filter kernel 1414 instead. The filtered lidar images can include new depth values, as well as updates to any other values included in the lidar images, e.g., new signal and noise values. Signal processor 1416 can make a determination of whether a depth value has sufficient accuracy to be reported to a later stage in the pipeline, or make a second pass determination based on the new values. In some embodiments, signal processor 1416 can analyze multiple filtered images resulting from different filter kernels being applied to a same lidar image, and use the set of filtered images to determine new (updated) values for the lidar pixels. For example, filter kernels of different sized grids can be applied to a same lidar image.

An output buffer 1418 can receive and cache processed lidar images for sending back to controller 1450 or other device as processed lidar images 1407. In some implementations, signal processor 1416 can retrieve processed images from output buffer 1418 for further analysis, e.g., when the processed image of a previous frame is needed to process the filtered image of a next frame. Such caching can also be performed internally to signal processor 1416. One or more processed images can then be passed to output buffer with a flag to identify that they are ready to be output.

As described above, color images can be obtained at the same time as the lidar images. Initial color images 1425 can be sent to a color image processor 1430. An input buffer 1432 can cache initial color images 1425 before being sent one at a time or multiple images at a time to a filter kernel 1434. As the pixels of a frame have a known spatial relationship (at least laterally, i.e., in the 2D image), embodiments can perform processing that takes advantage of this known spatial relationship by performing a group function on a group of color pixels, e.g., a 5×5 subgroup (or other sized group) or all the lidar images in a full frame. Various kernels can be used, as described below. More than one kernel can be applied, and the results can be combined.

A signal processor 1436 can analyze the filtered color images from filter kernel 1434. The filtered color images can include new (updated) values for colors (e.g., red, green, and blue) that define the color pixels. Signal processor 1436 can analyze multiple filtered images generated using various filter kernels on a same initial color image. Signal processor 1436 can include logic that uses values of neighboring pixels and/or multiple filtered color values of a same pixel to determine the new color value for the color image, e.g., for purposes of defining edges of objects. Signal processor 1436 can analyze groups of filtered images for a series of frames (e.g., for different positions of a light sensing module)

In some implementations, signal processor 1436 and signal processor 1416 can exchange information about the depth values and color values of corresponding pixels, so as to perform a combined processing that can account for the corresponding values of a lidar and color pixels, as well as neighboring pixels. Such a combined analysis can also use an AI co-processor. A bus 1460 can generally communicate information between lidar image processor 1410 and color image processor 1430, and specifically between signal processor 1416 and signal processor 1436. Lidar image processor 1410 and/or color image processor 1430 can separately or collectively be an image processing circuit.

An output buffer 1438 can receive and cache processed lidar images for sending back to controller 1450 or other device as processed color images 1427. In some implementations, signal processor 1436 can retrieve processed images from output buffer 1438 for further analysis, e.g., when the processed image of a previous frame is needed to process the filtered image of a next frame. Such caching can also be performed internally to signal processor 1436. One or more processed images can then be passed to output buffer with a flag to identify that they are ready to be output.

A post-processor 1440 can analyze the processed lidar image 1407 and/or the processed color images 1427. Post-processor 1440 can perform any combined analysis of lidar images and color images, as well as any classifications from an AI co-processor, e.g., that performs classification of pixels corresponding to a same object, pixel-wise semantic segmentation, instance segmentation, bounding box estimation, depth interpolation, etc.

A. Lidar Filtering and Processing

The filter kernels can be swept over a lidar frame. As examples, the application of filter kernels can provide range smoothing on neighboring range pixels and/or a time series of range values for a current lidar pixel, edge smoothing, or reduction in noise (e.g., using statistics). As an example, the range smoothing can provide a smoother road than would otherwise be obtained, which results in a more realistic depth images being provided to a user. Such filters can including bilateral filtering that uses a combination of range data, signal data, and other passive imaging channels (e.g., color). An edge-aware blurring filter can smooth (blur) values that are similar to each other spatially and in depth value (or color value) so that edges are preserved, but smoothing can occur away from an edge (e.g., an edge between two objects that are at different depths).

A filter kernel can determine kernel weights or "sameness" for each pixel with respect to a center pixel, so as to provide a filtered value for the center pixel. The filter kernel can weight data values for neighboring pixels based on a distance to the center pixel. The values further away would be less spatially correlated. Positions of neighboring pixels can be identified using the rectilinear array of the image frame. An example is a Gaussian weighting, e.g., a 2D Gaussian that weights the lateral (XY) distance from the center pixel. With the range values, a Gaussian weight can also be applied in the Z direction. A filtered value can be determined for a pixel from the weighted sum of the kernel applied to a center pixel, and the accumulated (aggregated) value (e.g., range, signal, noise, or color) can be used to determine whether the value is kept (e.g., sufficient confidence above a threshold), and passed to the user or a next stage in the pipeline.

As a result of applying the filter, a strength of the signal to noise in a signal can be increased such that a depth value can be kept. Such processing can be performed by signal processor 1416. For instance, if there are two pixels next to each other in the XY plane and both pixels have a peak at a similar distance (e.g., within a distance threshold or an accumulated value above a threshold), the peak can be identified as a real peak. In this manner, peak detection can use a variable (adjusted) threshold based on the signals at neighboring pixels. The threshold(s) and/or the underlying data can be changed (adjusted). The signal processor can make such an identification. The adjusting of a peak value or a detection threshold can be based on the aggregated information of the subset.

Accordingly, in some implementations, the one or more filter kernels of filter kernel 1414 can include a filter kernel that adjusts a peak value or a detection threshold of a signal for a given pixel using signals of other lidar pixels neighboring the given pixel. As a further example, the one or more filter kernels of filter kernel 1414 can include a filter kernel that adjusts a depth value for a given pixel using signals of other lidar pixels neighboring the given pixel. In various implementations, the criteria for considering a pixel to be a neighboring pixel (e.g., in a particular subset) can use lateral position, depth values, and/or color values.

B. Color Filtering and Processing

One or more filter kernels can be swept over a color frame. As examples, the application of filter kernels can provide color smoothing (or blurring) on neighboring color pixels and/or a time series of color values for a current color pixel, edge smoothing, or reduction in noise (e.g., using statistics). As an example, the color smoothing can provide a smoother or more uniform colors to objects than would otherwise be obtained, which results in a more realistic color images being provided to a user. The filter kernel can weight data values for neighboring pixels based on a distance to the center pixel in a similar manner as the filter kernels used for the lidar images.

The filtering and/or processing can correct color values that have spurious noise. For example, in low light where few photons are detected, noise can override the true signal. An object that might be red (e.g., a step sign) might appear to have some green pixels. On average, the pixels are red, but not all the pixels are actually registering as red because the signal is so low that some of them are registering a green object in the environment. But, the filtering can accumulate values from neighboring pixels to increase the red contribution.

The processing can identify the surrounding pixels as red (e.g., a majority of surrounding pixels), such that the system can override (discard) the pixel(s) that are erroneously green and identify a group of pixels as being all red using an accumulated filter that is spatially aware. Thus, the adjusting of the color can use the color pixel at issue or just use the neighboring pixels, e.g., to override the measured color. Thus, adjusting the first color pixel can include determining a weighted average of the color pixels correlated to the subset of the depth pixels. The weighted average may or may not include the first color pixel. The weights can be determined based on differences in the other depth values from the first depth value.

C. Combined Lidar and Color Filtering and Processing

As described above, lidar image processor 1410 and color image processor 1430 can transmit information to each other, including values for lidar and color images, so that a combined processing can be performed. For example, in some implementations, the color values in any of the color images (e.g., initial, filter, or processed) can be used to estimate noise, which can then be used in determining a depth value, an accuracy of a depth value, and/or whether or not to report a depth value in a final lidar image, e.g., as provided to a user. For example, when the level of ambient light is low, just measuring the noise in the wavelength of the light source might lead to inaccuracies, particularly when the background light is no uniform over time. The intensity of the color pixels can be used instead or to supplement the noise measurements.

As another example, the ambient data may have higher resolution than the lidar data, e.g., the color pixels can have a higher resolution. This may occur when the color sensors are on a different sensor, e.g., which may not rotate. PCT publication WO 2018/213338, which is incorporate by reference in its entirety for all purposes, provides such an example of fixed cameras that are triggered by a rotating lidar sensor, where the color pixels and lidar pixels are aligned. The trend in changes of the color in the color pixels can be determined, e.g., as an interpolated or functional fit to any set of color values at the color pixels. This function can be used to determine the depth values in between the measured lidar pixels, thereby enabling an upsampling of the lidar data to a higher resolution.

Accordingly, when the detection circuit comprises color sensors that detect ambient light to generate an array of color pixels, the depth imaging circuit can correlate one or more of the depth pixels to each of the color pixels. The one or more filter kernels of filter kernel 1414 can include a filter kernel that adjusts a color value for a given color pixel using color pixels correlated to other lidar pixels neighboring the given color pixel. The other lidar pixels can satisfy one or more proximity criteria including a difference between a first depth value correlated to the given color pixel and other depth values of the other lidar pixels.

Accordingly, depth (ranging) values can be adjusted based on similar color or spatial position.

VI. Classification

Besides or in addition to updating depth and color values based on lidar and color images, embodiments can analyze such images using machine learning models and other artificial intelligence (AI) models to identify and classify objects. Such classification information can be used in a variety of ways. For example, an AI co-processor can perform semantic labeling on a series of images. Once objects are classified and assigned to specific lidar and/or color pixels, such information can be used to update such images. The AI co-processor (or classification circuit) can be a kernel-based processor when the processor operates on a collection of pixels.

Figure 15:
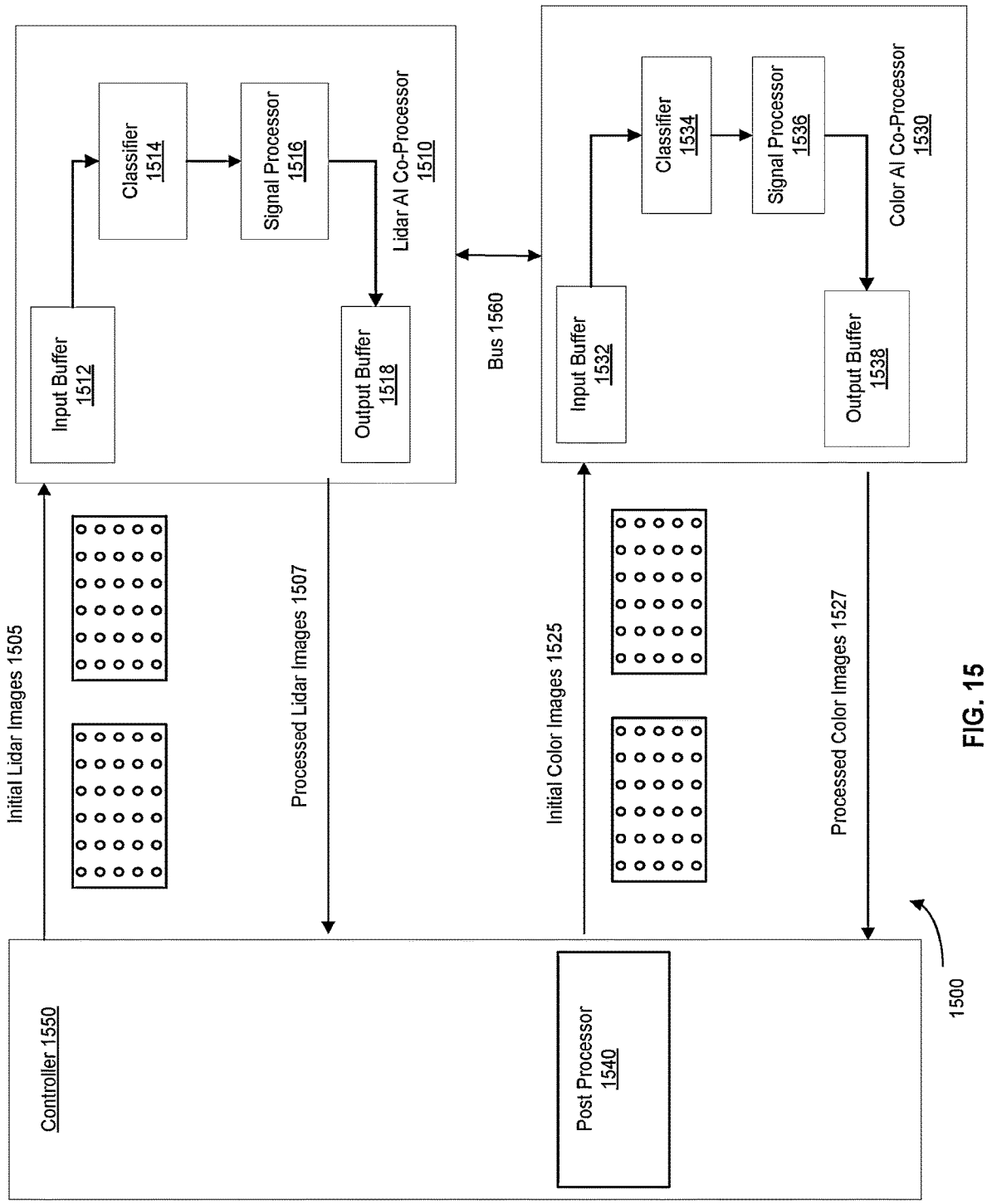
FIG. 15 shows a light ranging system including a controller and a lidar AI co-processor according to embodiments of the present disclosure.

FIG. 15 shows a light ranging system 1500 including a controller 1550 and a lidar AI co-processor 1510 according to embodiments of the present disclosure. Controller 1550 can correspond to other controllers described herein. Various components of light ranging system 1500 can be on a same or different integrated circuits.

Controller 1550 sends initial lidar images 1505 (e.g., images #1 and #2 in FIG. 13) to lidar AI co-processor 1510. As described above, controller 1550 can cache the histogram data that is streaming out of the sensors to determined depth values to create initial lidar images as frames of a stream of lidar images. The stream of lidar images can be provided to lidar AI processor 1510 as a light sensing module scans over different positions. As shown, two lidar images are shown to illustrate the stream of lidar images that can be provided. The stream of images can be in an order generated, e.g., in an order of the positions. In some implementations, a position can be provided as part of metadata provided with a lidar image.

In lidar AI co-processor 1510, an input buffer 1512 can cache initial lidar images 1505 before being sent one at a time or multiple images at a time to a classifier 1514. As the pixels of a frame have a known spatial relationship (at least laterally), embodiments can perform processing that takes advantage of this known spatial relationship in analyzing a group of lidar pixels, e.g., a 5×5 subgroup (or other sized group) or all the lidar images in a full frame. The properties of a group of depth values for different pixels can be used as opposed to individual pixels. For instance, one can use the statistics for the depth values of the group to determine which pixels correspond to a same object, e.g., a group of pixels having depth values within a threshold of each other. Corresponding to a same object is one way of correlating two pixels. Such a classification for a group can be used to increase accuracy of depth values of a final lidar image, fill in missing data, provide greater resolution, etc. Various classification models can be used, as described below. More than one classification model can be applied, and the results can be combined.

Classifier 1514 can provide classification information (e.g., classified lidar images with certain pixels identified as corresponding to a same object) to a signal processor 1516, which may be optional or have functions that are implemented in classifier 1514 instead. Various models can be used for classifier 1514, including convolution neural networks, which can include convolutional kernels that can be implemented by a filter kernel (e.g., 1414 of FIG. 14). A classified color image can assign each lidar pixel to an object (e.g., using an ID) so that all pixels corresponding to a same object can be determined via the contents of the classified lidar image. Accordingly, the classification information can indicate which lidar pixels of a lidar image correspond to the same object.

Signal processor 1516 can make a determination of whether a depth value has sufficient accuracy to be reported to a later stage in the pipeline based on the neighboring pixels being assigned to a same object. In some embodiments, signal processor 1516 can analyze multiple classified images resulting from different classification of a same lidar image, and use the classifications to determine new (updated) values for the lidar pixels. In addition or instead, signal processor 1516 can use multiple classified images corresponding to different positions of a light sensing module. For example, classifications using various models can be applied to a same lidar image, e.g., a decision tree and a neural network, or different types of such models, or use of different parameters for a same model, such as number of nodes or hidden layers.

An output buffer 1518 can receive and cache processed lidar images for sending back to controller 1550 or other device as processed lidar images 1507. In some implementations, signal processor 1516 can retrieve processed images from output buffer 1518 for further analysis, e.g., when the processed image of a previous frame is needed to process the classified image of a next frame. Such caching can also be performed internally to signal processor 1516. One or more processed images can then be passed to output buffer with a flag to identify that they are ready to be output.

Accordingly, a classifier circuit (e.g., lidar AI co-processor 1510) can be communicably coupled with the light ranging device and configured to receive the lidar images output by the ranging circuitry, analyze the depth values in the lidar pixels of the lidar images, correlate a set of lidar pixels based on corresponding depth values of the set of lidar pixels, and output classification information of the set of lidar pixels based on the correlating. As described herein, the set of correlated lidar pixels can include a first lidar pixel in a first lidar image that is correlated to a second lidar pixel in a second lidar image as corresponding to a same point of an object in the environment.

As described above, color images can be obtained at the same time as the lidar images. Initial color images 1525 can be sent to a color AI co-processor 1530. An input buffer 1532 can cache initial color images 1525 before being sent one at a time or multiple images at a time to a classifier 1534. As the color pixels of a frame have a known spatial relationship (at least laterally), embodiments can perform processing that takes advantage of this known spatial relationship by performing a group function on a group of color pixels, e.g., a 5×5 subgroup (or other sized group) or all the lidar images in a full frame, as described for lidar images.

A signal processor 1536 can analyze the classified color images from classifier 1534. A classified color image can assign each color pixel to an object (e.g., using an ID) so that all pixels corresponding to a same object can be determined via the contents of the classified color image. Signal processor 1536 can analyze multiple classified images generated using various classification models on a same initial color image. Signal processor 1536 can include logic that uses classifications of neighboring pixels and/or multiple classifications of a same pixel to determine the new color value for the color image, e.g., for purposes of defining edges of objects. Signal processor 1536 can analyze groups of classified images for a series of frames (e.g., for different positions of a light sensing module)

In some implementations, classifiers 1514 and 1534 (and/or signal processors 1516 and 1536) can exchange information about the depth values and color values of corresponding pixels (as well as their classifications), so as to perform a combined processing that can account for the corresponding values of a lidar and color pixels, as well as neighboring pixels when making a classification or determining new values for the images. For example, a similarity in color and/or depth (e.g., within respective threshold) can be used as criteria for classifying pixels as corresponding to a same object. Such a combined analysis can also use lidar and color image processors. A bus 1560 can generally communicate information between lidar AI co-processor 1510 and color AI co-processor 1530, and specifically between signal processor 1516 and signal processor 1536.

An output buffer 1538 can receive and cache processed lidar images for sending back to controller 1550 or other device as processed color images 1527. In some implementations, signal processor 1536 can retrieve processed images from output buffer 1538 for further analysis, e.g., when the processed image of a previous frame is needed to process the classified image of a next frame. Such caching can also be performed internally to signal processor 1536. One or more processed images can then be passed to output buffer with a flag to identify that they are ready to be output.

A post-processor 1540 can analyze the processed lidar images 1507 and/or the processed color images 1527. Post-processor 1540 can perform any combined analysis of classified lidar images and color images.

The classification of pixels to an object can be output on a display to a user. For example, a bounding box can illustrate the lidar pixels identified as correspond to a same object.

A. Presemantically Identified Masks

Classifiers 1514 and 1534 can use knowledge of the types of objects that may be encountered by a particular lidar system, e.g., one installed on a passenger vehicle that travels on standard roads. For example, a road will always exist for system installed on a passenger vehicle, where the road can be limited to a lower half of the environment and have a limited width. As another example, a size of a neighboring vehicle can be limited for the classification based on an initially perceived height, so as to distinguish between two vehicle next to each, while still allowing the detection of a large semi-truck with a trailer, whose height would be much greater.

In some embodiments, a user can define the areas of the image for a particular object, e.g., the road. For instance, a lidar device can be mounted on a bumper of a vehicle, and a manufacturer of the vehicle can specify a particular section of the environment that might correspond to the road based on the knowledge of the height of the number. Such user input could be provided by drawing on a user interface or provide as numerical input for points of a rectangle or other shape to which the object is restricted.

Accordingly, the detection criteria for a lidar pixel can vary based on where in the lidar image the pixel exists. A lidar pixel that is in front of the vehicle and the lower half of the image can likely correspond to the roadway. Such a pixel may be detected by a sensor whose field of is angled down e.g., by a specified pitch. Thus, a less stringent threshold for the signal relative to noise can be allowed, thereby enabling a weak detection to still provide a depth value for a particular pixel. In contrast, a lidar pixel in a different part of the image can have more stringent requirement for peak detection and determination of a depth value to be determined with sufficient accuracy to be output.

B. Lidar Classification and Processing

Classifier 1514 can use the depth values from one or more lidar images to determine which pixels correspond to a same object. The use of the depth values can increase the accuracy of the classifier, as depth values for neighboring points on a same object will not change drastically from one pixel to a neighboring pixel, e.g., a neighboring position on the rectilinear grid. The use of depth values of neighboring lidar pixels allows provides an increased confidence in identifying two pixels as being from a same object, e.g., compared to just using color values.

Once a group of lidar pixels are identified as corresponding to a same object, the depth values may be smoothed just for that group of pixels, e.g., as performed by lidar image processor 1410, which can received classification information from lidar AI co-processor 1510. Similarly, color image processor 1430 can make all the color pixels of a same object a similar color or just blend the colors of the pixels identified as corresponding to that object.

The classification can also inform the determination of a depth value, or at least the confidence in a depth value, which can be used to determine whether a depth value is included in a final lidar image. If a lidar pixel is identified as being from a same object as a neighboring pixel and if the depth values are similar, the depth value for a pixel can be included, even if the number of photons counts in the histogram were relatively low so that the initial confidence was low. The increased confidence from the classification can be sufficient to determine the depth value is accurate, particularly after a filter kernel is applied, e.g., to smooth the depth values for the object. The use of the classification (e.g., semantic labeling) could be done as a second pass using a filter kernel that accumulates signal values according to weights defined by a kernel function (e.g., Gaussian) as described herein. This second pass of accumulation (e.g., the first just using filter kernel 1414 and signal processor 1416) can use depth values of more pixels than used just based on lateral proximity, e.g., as may be done in the first pass. Accordingly, the accumulation can be performed using both spatial information and semantic (classification) information The classification model can account for predetermined types of objects, e.g., a vehicle that has multiple components, such as a windshield, a headlight, a door, a hood, etc. Each component can have an expected relationship among the neighboring points, which can inform the kernel function used in a filtering step or information the classification based on the expected depth and/or color relationship (e.g., a windshield being a different color than a hood, but being part of the same vehicle object).

In some embodiments, a type of object can be used to determine the type of filter kernels that are used, e.g., by filter kernel 1414. For example, some types of objects may have a smoothing kernel applied while others would not. For instance, a group of pixels classified as corresponding to the road can be smoothed by a smoothing filter. But, a group of pixels identified as corresponding to a tree or other rough surface would not have a smoothing filter applied. As another example, a stop sign can be classified based on 3D position (e.g., height above the roadway) and shape (an octagon), as can be determined from depth values in the lidar images. The range values of the associated pixels can be adjusted based on the fact object type being a plane. Not only which filter kernels are applied the particular values for the parameters can be used, e.g., a shape and height of a Gaussian kernel can depend on the type of object.

A type of object can have certain expected sizes, which can be used in a detection technique for determining whether there is sufficient confidence to include a depth value in a final lidar image. For example, a road can occupy a limited part of the environment. A lower confidence can be allowed for including depth values for pixels that correspond to an expected location of the roadway, which can increase a distance range for the final lidar image without compromising accuracy. Thus, if a lidar pixel corresponds to a predefined location for a particular object, then more lenient criteria (e.g., peak and/or noise thresholds) can be used, thereby enabling more aggressive inclusion of pixels in the final lidar image.

C. Color Classification and Processing

The upsampling of lidar data based on higher resolution color data was described above. Additionally or instead, the lidar data can be upsampled based on the classification data. For example, an object of a particular type may have known parameters for a shape, or at least estimated parameters for a shape. For instance, a vehicle type may be determined from the color and/or lidar data, e.g., based on a general outline of the object. Then, the shape of the vehicle type can identified, e.g., from a database. The shape may have small specific features, e.g., a fin or line on a door. The lidar data can be upsampled to show such features in a final lidar image, e.g., in a three-dimensional (3D) view. Further, any missing lidar data (e.g., some lidar pixels may be missing due to noise or low signal) can be filled in based on the estimate shape of the object.

The shape of the object (e.g., determined from the classification of a group of color pixels as belonging to the same object) can also be used to identify anomalies in the lidar data, e.g., due to spurious lens, as might occur during rain. A general distance of a vehicle can be estimated based on the number of color pixels assigned to the vehicle. A small number of color pixels assigned to the vehicle would indicate the vehicle is relatively far away, e.g., more than 50 m). But, if the range values for the corresponding lidar pixels (i.e., the lidar pixels at the same locations in the images) indicate the vehicle is relatively close, e.g., within 10 m, then an anomaly can be identified in the color data or the lidar data. If the conditions are rain (e.g., as determined by weather information or humidity sensor), then the lidar data can be identified as the anomaly. In such a case, the corresponding lidar data may not be registered, so as not to show invalid data to a user, which might cause a sudden reaction to a driver, potentially leading to an accident.

D. Combined Filtering and Classification

As described above, the classification in FIG. 15 and the filtering/processing in FIG. 14 can be used in combination. For example, the classification information can be used to fill in missing lidar pixels based on other lidar pixels of a same object.

Figure 16:
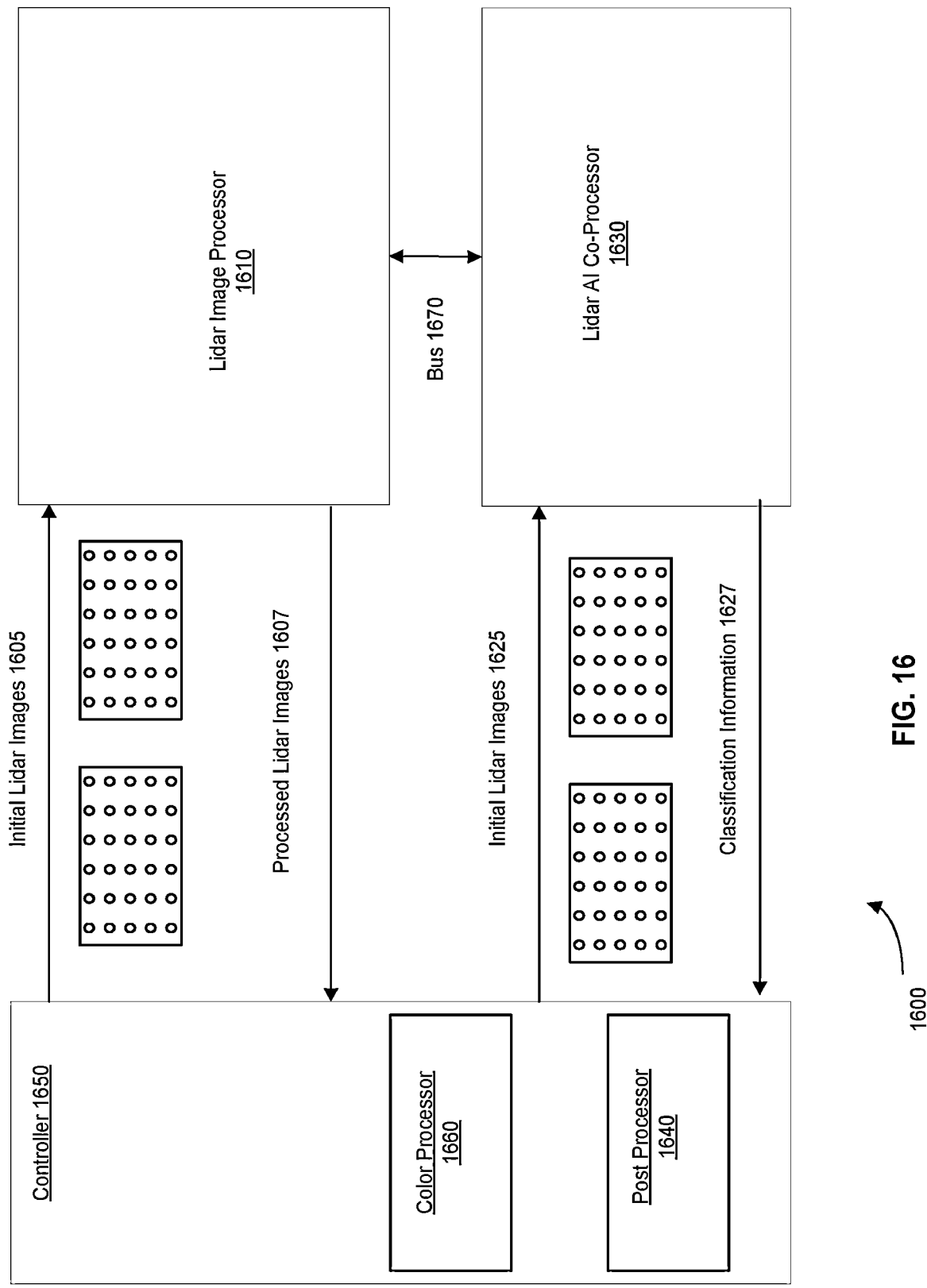
FIG. 16 shows a light ranging system including a controller, a lidar image processor, and a lidar AI co-processor according to embodiments of the present disclosure.

FIG. 16 shows a light ranging system 1600 including a controller 1650, a lidar image processor 1610, and a lidar AI co-processor 1630 according to embodiments of the present disclosure. Controller 1650 can correspond to other controllers described herein. Various components of light ranging system 1600 can be on a same or different integrated circuits.

Light ranging system 1600 can operate in a similar manner as light ranging systems 1400 and 1500. Controller 1650 can send initial lidar images 1605 to lidar image processor 1610, which can operate in a similar manner as lidar image processor 1410. Controller 1650 can also send initial lidar images 1625 to lidar AI co-processor 1630, which can operate in a similar manner as lidar AI co-processor 1510. Initial lidar images 1605 may be the same as initial lidar images 1625.

A bus 1670 can generally communicate information between lidar image processor 1610 and lidar AI co-processor 1630, including individual components within these processors. The communication of intermediate or final results from one processor to the other can be used to complete the processing to output processed lidar images 1607 or classification information 1627, which may include classified images where groups of pixels corresponding to a same object are identified. Such usage of processed lidar images to inform classification or classified images to inform the processing of lidar images (e.g., to update or add depth values) has been described above.

A similar configuration can be used for color processing. For example, a color image processor and a color AI co-processor can communicate with each other, as well as to lidar image processor 1610 and lidar AI co-processor 1630. Color processor 1660 can embody such a configuration.

A post-processor 1640 can analyze the processed lidar images 1607 and/or the classification information 1627. Post-processor 1640 can perform any combined analysis of classified lidar images and color images.

Accordingly, a system with a classifier circuit can also include a depth imaging circuit communicably coupled with the light ranging device and the classifier circuit, the depth imaging circuit configured to receive the lidar images of lidar pixels, receive the classification information about groups of lidar pixels that correspond to the same object, and apply one or more filter kernels to subsets of lidar pixels of the lidar frames based on the classification information.

VII. Key Points (Image Registration)

In some embodiments, the classification (e.g., by classifier 1514) can include identifying keys points in images, and identifying that certain keypoints in one frame correspond to certain keypoints in other frames of a series of lidar images. Keypoints can be identified by analyzing the magnitude and direction of changes in depth values (and/or color values) in local image neighborhoods to detect high-contrast corners and edges, where depth/color values show significant changes.

Keypoints can be used in mapping or odometry problems to determine how a vehicle (e.g., a car or robot) is moving in 3D space. Using two images from lidar, the system can determine how the vehicle changed position relative to the keypoints, which may be stationary. Image registration may be performed in in 2D or 3D by correlating two keypoints as corresponding to the same point on an object in the two images. A keypoint can have a unique signature, e.g., an edge of a building. The edge of the building can be identified via the depth values changing in a new direction (or rate) before and after the edge, which can be defined by a series of points having exhibiting a similar change.

Accordingly, the correlation of two keypoints to a same point in an object can use differences in depth values between adjacent depth (lidar) pixels. A similar difference (e.g., within a threshold) to one or more neighboring pixels in each of the two images can indicate that the two keypoints are for the same point on the same object.

As another example, peak values for a particular time bin can be used. For instance, if a particular point on an object has unique differences in depth values relative to its neighbors, a unique pattern of peak values can also exist. The signal at the point for a given time bin will be higher than the signal at the neighboring pixels, where the difference in signal values will depend on the depth difference between the two points. A similar difference in the signal values to each neighboring pixel(s) can indicate the keypoint is the same in each image.

Once two keypoints are correlated between two images to identify them as a same keypoint, their 3D positions (depth in combination with lateral positions in the grid) can be subtracted to provide a change in relative 3D position of the vehicle to the keypoint. If the keypoint is stationary, then the subtracted value can be used to determine a velocity, when combined with a time interval of the two measurements. Such a computation can be performed for numerous keypoints between images to obtain an average motion of the lidar system installed on the vehicle.

Accordingly, a lidar AI co-processor (e.g., 1510 or 1610) can analyze multiple lidar images to identify correlated keypoints between frames of lidar images. The lidar AI co-processor can identify keypoints in one frame, buffer the lidar pixels corresponding to the keypoints (which may be done by storing the entire lidar frame or just certain pixels, including depth values and pixel positions), determine keypoints in a subsequent frame, and then derive correlations between the two sets of keypoints. Accordingly, a second lidar image can be acquired after a first lidar image, where the first lidar image is buffered while the second lidar image is acquired.

Classification information 1627 can include the correlation of keypoints. For example, bundles of lidar pixels in separate frames (e.g., consecutive frames) can be bundled as a keypoints, where postprocessor 1640 can use these bundled keypoints to determine an average velocity. Other later components in the pipeline can also perform the computation to determine the average velocity, e.g., components of a stand-alone computer, such as of vehicle control unit 217 of FIG. 2. The velocity values over time can be used together to determine the odometry. Differences from consecutive frames of further separated frames (e.g., a first and third frame) can be used to determine the velocities. Multiple differences among the lidar pixels of two more pairs of frames can be used to obtain increased accuracy.

The keypoints can be used for visualization as well, e.g., a particular color can be used to depict lidar pixels corresponding to the keypoints. An arrow showing relative velocity can also be displayed. Such a depiction can convey the relative motion of the vehicle compared to stationary and other moving objects.

In some embodiments, the classification of keypoints can be combined with a semantic classification of groups of pixels as corresponding to respective objects. Such different types of classification can be performed by separate classification engines of classifier 1514.

As an example, keypoints can be assigned to a moving object based on the pixels of the keypoints being grouped together as part of a same moving object. The keypoints assigned to a moving object can be used to determine the velocity of the moving object, where such velocity may be relative to the lidar system or absolute. Such an absolute velocity can be determined first by determining the velocity of the lidar system relative to one or more stationary objects. Then, the changes in the keypoints of the moving object can be used to determine a relative velocity compared to the lidar system. The velocity of the lidar system and the relative velocity of the moving object can be subtracted to determine the absolute velocity of the moving object relative to the stationary objects. All of the pixels of the moving object can be assigned the same average velocity determined from the keypoints assigned to the moving object.

Various techniques can be used to correlate keypoints. The pixel ID (e.g., position in a the 2D grid of the lidar image) of a keypoint can be a starting point for identifying the same position on the object in a subsequent frame. A similar depth value relative to surrounding lidar pixels can indicate that the same edge or corner is reflected in a new pixel ID for the next lidar image. These two pixel IDs for the two frames can be grouped as a keypoint. Machine learning techniques, e.g., a neural network may be used. The correlation can use color data as well, so a signature change in color from a color pixel to surrounding color pixels can be used in combination with the depth of a corresponding lidar pixel to surrounding lidar pixels. For instance, two pixels can be identified as red (proximity in color), spatially close together, and have a similar contrast metric relative to surrounding pixels.

Certain criteria can be used for tracking lidar pixels in the first place, before correlation is attempted, e.g., sufficient depth value change among surrounding pixels. A high confidence for the depth value of a pixel can also be required. For instance, a road may not have enough texture to qualify as a key point.

Accordingly, a coprocessor (e.g., the classification circuit) can receive a first frame of depth pixels from the detection circuit and identify a first set of key points in the first frame of depth pixels using differences in depth values between adjacent depth pixels and/or differences in peak values between adjacent depth pixels. The first set of key points, including the differences used to identify the key points and three-dimensional positions formed by lateral (2D) positions of the depth pixels and the corresponding depth values, can be stored in a first buffer.

The coprocessor can receive a second frame of depth pixels from the detection circuit and identify a second set of key points in the second frame of depth pixels using differences in depth values between adjacent depth pixels and/or differences in peak values between adjacent depth pixels. One or more of the first set of key points can then be correlated to one or more of the second set of key points using the differences and the three-dimensional positions. For example, the depth values and the lateral positions should be within a threshold if the images are consecutive. The velocities of key points can be computed using differences between correlated pairs of key points. The velocities can be relative to the velocity of the lidar device. The velocities can be output in a variety of ways, e.g., by identifying objects having a velocity higher than a threshold or by providing numbers in an image over the object.

VIII. Methods

Various techniques are described above, e.g., for reconstructing lidar images and image analysis (e.g., adjusting values associated with a lidar image and/or a color image). Such techniques can use systems described above.

A. Reconstruction of Lidar Image

The reconstruction of an image can facilitate downstream analysis, e.g., classification or image analysis using kernels applied to values associated with pixels.

Figure 17:
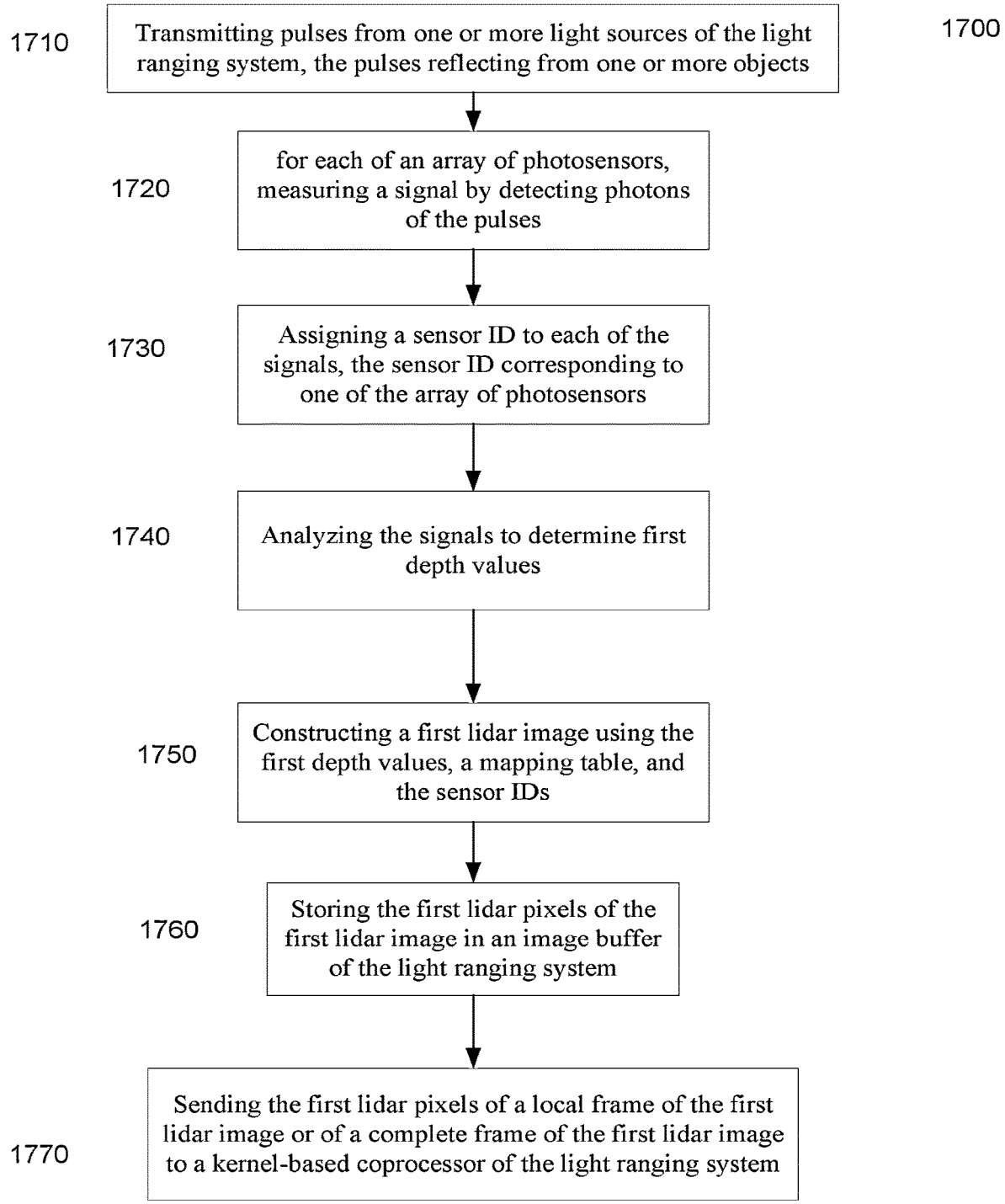
FIG. 17 is a flowchart illustrating a method for performing ranging using a light ranging system installed on a mobile apparatus according to embodiments of the present disclosure.

FIG. 17 is a flowchart illustrating a method 1700 for performing ranging using a light ranging system installed on a mobile apparatus according to embodiments of the present disclosure. The mobile apparatus can be various types, e.g., a car, farm equipment, construction equipment, etc.

At block 1710, a transmission circuit transmits pulses from one or more light sources of the light ranging system. The pulses can reflect from one or more objects. The transmission circuit can include various circuitry described above, e.g., lasers.

At block 1720, a detection circuit measures a signal by detecting photons of the pulses using for each of an array of photosensors. The detection circuit can include various circuitry described above, e.g., each photosensor being a group of SPADs.

At block 1730, a sensor ID is assigned to each of the signals. Each sensor ID corresponds to one of the array of photosensors. The sensor IDs can be assigned in various ways and at various points in the pipeline. For example, the sensor ID can be received from the detection circuit with the signal, and thus the sensor ID can be assigned at that time. In another example, the sensor IDs are assigned based on a specified order in which the signals are provided by the detection circuit, as is described above. In yet another example, the sensor IDs are assigned to each of the signals by assigning the sensor IDs to the first depth values. Such an assignment can be done by an image reconstruction circuit (e.g., 1325 of FIG. 13). Thus, the sensor IDs can be assigned based on a specified order in which the first depth values are provided to the image reconstruction circuit.

At block 1740, the signals are analyzed to determine first depth values. The signals can be analyzed as described herein.

At block 1750, a first lidar image is constructed using the first depth values. A lidar image can be constructed using a mapping table as described above. The sensor IDs can be used to map the first depth values to first lidar pixels in the first lidar image (e.g., a rectilinear image). The mapping table can specify a lidar pixel based on a corresponding sensor ID. For example, the mapping table can specify a lidar pixel based on the corresponding sensor ID and a position of the light ranging system when the signal is measured. The position can be an angular position of the light ranging system. The sensor ID and the position can specify a unique pixel within the image, e.g., as described above in FIG. 9.

At block 1760, an image buffer of the light ranging system can store the first lidar pixels of the first lidar image. The image buffer can be considered local when the image buffer resides on a same integrated circuit as the detection circuit.

At block 1770, the first lidar pixels of a local frame of the first lidar image or of a complete frame of the first lidar image are sent to a kernel-based coprocessor of the light ranging system. As described above, only a portion (local frame) of the lighter image may need to have values before being sent, e.g., as a kernel can be applied to that local frame. Thus, a filter kernel can be applied to a portion of the first lidar image, wherein the filter kernel is applied before the first lidar image is completely constructed.

Additional lidar images can be constructed and analyzed in a similar manner. For example, a second lidar image can be constructed using second depth values. The second lidar image can also be stored in the image buffer, e.g., in a different memory bank than which the first letter images stored. One or more values of the first lidar image can be adjusted based on an analysis of the first lidar image and the second lidar image, thereby obtaining one or more adjusted values. Examples of such adjustment are described in FIGS. 14 and 15. The one or more adjusted values can include color values of the first lidar image, e.g., where color pixels are associated with lidar pixels.

B. Adjusting Peak Value or Detection Threshold

Various values associated with a lidar pixel and a lidar image can be adjusted based on values of other pixels and proximity to the lidar pixel. For example, such values can include a peak value or a detection threshold. The adjustment values can be based on filter kernel, e.g., as described in section V.

Figure 18:
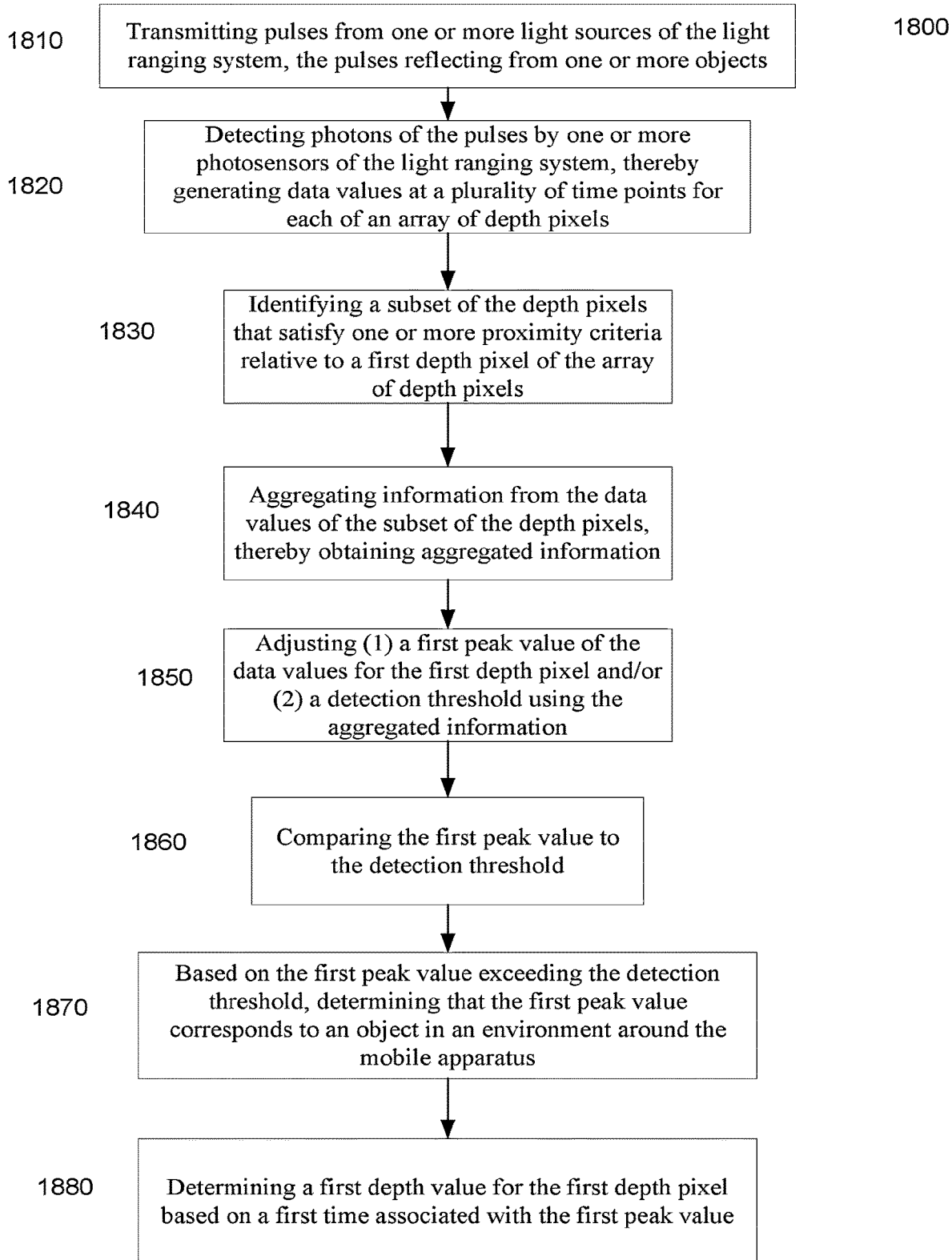
FIG. 18 is a flowchart illustrating a method of performing ranging using a light ranging system installed on a mobile apparatus according to embodiments of the present disclosure.

FIG. 18 is a flowchart illustrating a method 1800 of performing ranging using a light ranging system installed on a mobile apparatus according to embodiments of the present disclosure.

At block 1810, a transmission circuit transmits pulses from one or more light sources of the light ranging system. The pulses can reflect from one or more objects. The transmission circuit can include various circuitry described above, e.g., lasers.

At block 1820, photons of the pulses are detected by one or more photosensors of the light ranging system, thereby generating data values at a plurality of time points for each of an array of depth (lidar) pixels. The one or more photosensors can include an array of photosensors. Examples of photosensors are provided herein, e.g., each photosensor being a group of SPADs. The data values at the plurality of time points can form a histogram for each depth pixel of the array of depth pixels. A counter of the histogram at a particular time bin can correspond to one or more data values at one or more time points within the particular time bin, as described above.

A first light source of the one or more light sources and a first photosensor of the one or more photosensors can move, thereby being used to provide the data values for at least two depth pixels of the array of depth pixels. An example of such an operation is provided in FIG. 9.

At block 1830, a subset of the depth pixels that satisfy one or more proximity criteria relative to a first depth pixel of the array of depth pixels is identified. The one or more proximity criteria can include a lateral distance between the first depth pixel and another depth pixel. The one or more proximity criteria can further include a difference between a first preliminary depth value of the first depth pixel and another preliminary depth value of another depth pixel.

At block 1840, information from the data values of the subset of the depth pixels is aggregated, thereby obtaining aggregated information. As examples, the information from the data values can includes the data values or numerical values derived from the data values. The aggregating can include determining a sum (e.g., a weighted sum) of data values from corresponding time bins. As described above, the aggregated information can be used to determine whether the signal for given pixel is sufficiently strong so that the value is for analyzing in a later stage.

At block 1850, a first peak value of the data values for the first depth pixel and/or a detection threshold is adjusted using the aggregated information.

At block 1860, the first peak value is compared to the detection threshold. When the first peak value exceeds the detection threshold, a reflective pulse can be identified as coming from an object in the environment.

At block 1870, based on the first peak value exceeding the detection threshold, it is determined that the first peak value corresponds to an object in an environment around the mobile apparatus. The detection threshold can be a fixed value or a dynamic value.

At block 1880, a first depth value for the first depth pixel is determined based on a first time associated with the first peak value. Such a depth value can be determined as described herein.

A peak value and a detection threshold can be used to detect a reflective pulse, and can be adjusted in various ways. Background levels of photons can be determined in the subset of the depth pixels, and peak values of the data values can be determined in the subset of the depth pixels. The first peak value can be adjusted using the peak values, and the detection threshold can be adjusted using the background levels.

In some examples, ambient light can be measured using color sensors to generate an array of color pixels. One or more of the color pixels can be correlated to each of the depth pixels, e.g., as described herein. In such examples, the one or more proximity criteria can include a similarity in color of the one or more of the color pixels for the first depth pixel relative to the other depth pixel.

C. Adjusting Depth Values

Besides a peak value or a detection threshold, a depth value can be adjusted. The adjustment values can be based on filter kernel, e.g., as described in section V or section VI.

Figure 19:
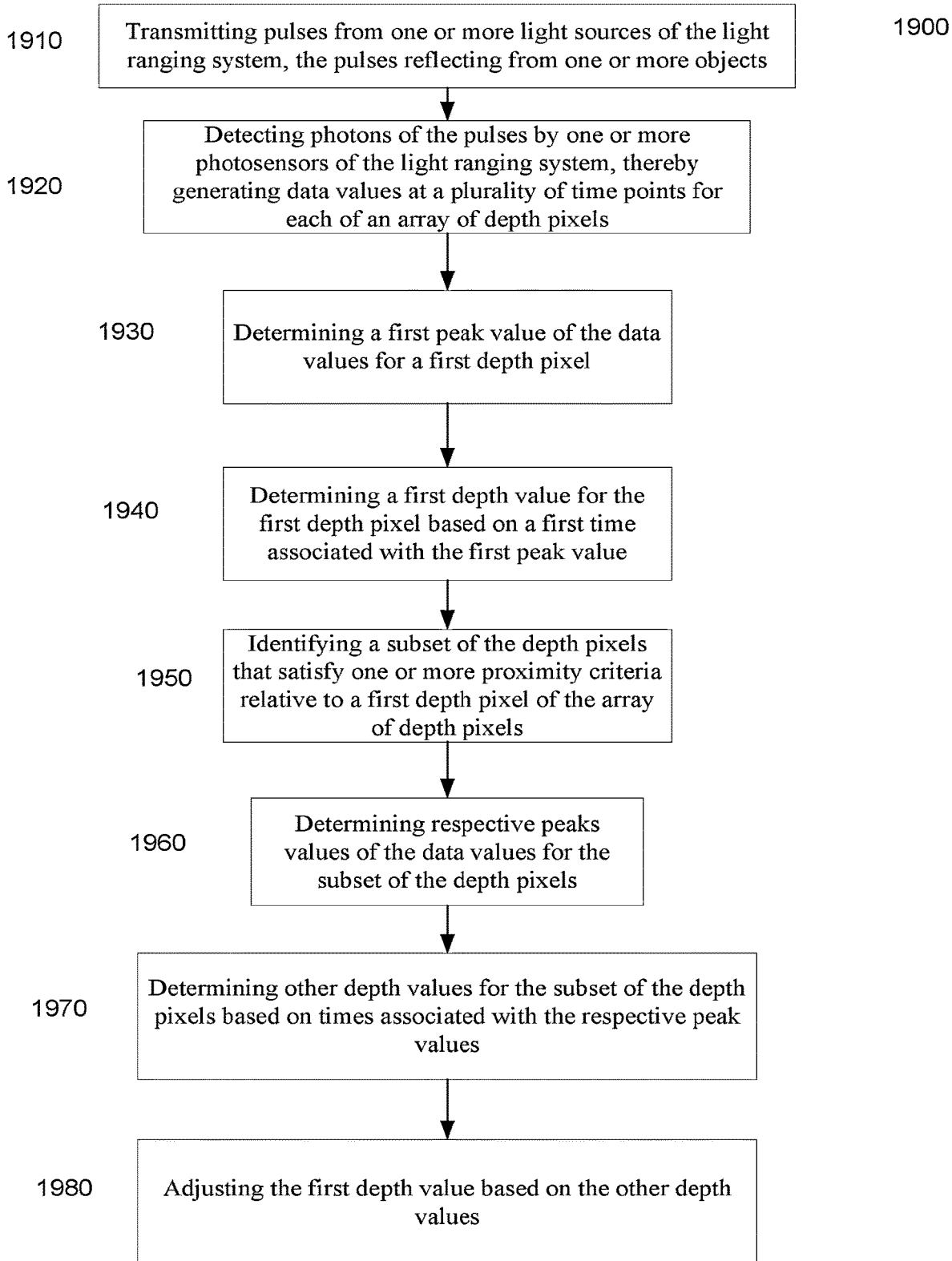
FIG. 19 is a flowchart illustrating a method of performing ranging using a light ranging system installed on a mobile apparatus.

FIG. 19 is a flowchart illustrating a method 1900 of performing ranging using a light ranging system installed on a mobile apparatus.

At block 1910, a transmission circuit transmits pulses from one or more light sources of the light ranging system. The pulses can reflect from one or more objects. The transmission circuit can include various circuitry described above, e.g., lasers. Block 1910 can be performed in a similar manner as block 1810 and other detection disclosure herein.

At block 1920, photons of the pulses can be detected by one or more photosensors of the light ranging system, thereby generating data values at a plurality of time points for each of an array of depth pixels. Block 1920 can be performed in a similar manner as block 1820 and other detection disclosure herein.

At block 1930, a first peak value of the data values is determined for a first depth pixel. A peak value can be determined in various ways, e.g., as described herein. For instance, a match filter can be used to detect a particular pulse pattern, and the signal (e.g., as defined in a histogram) at the matching time can be used to determine the first peak value.

At block 1940, a first depth value is determined for the first depth pixel based on a first time associated with the first peak value. The first depth value can be determined in various ways, e.g., as described herein. For instance, an interpolation method can be used to determine a time with greater resolution than the width of a time bin.

At block 1950, a subset of the depth pixels is identified that satisfy one or more proximity criteria relative to a first depth pixel of the array of depth pixels. Various proximity criteria can be used, as described herein. In various implementations, such neighboring depth pixels can be used to refine values associated with a depth pixel or to discard such a measurement to say on efficiency and later stages of the pipeline.

At block 1960, respective peak values of the data values are determined for the subset of the depth pixels. The respective peak values can be determined in a similar manner as the first depth value.

At block 1970, other depth values are determined for the subset of the depth pixels based on times associated with the respective peak values. The other depth values can be determined in a similar manner as the first depth value.

At block 1980, the first depth value is adjusted based on the other depth values. For instance, the adjusted first depth value can be determined as an average of the first of value in the other depth values. Other examples can include classifications of pixels is corresponding to a same object as well as use of other kernel-based techniques.

Additionally, classification can be done. Thus, method 1900 can include classifying a portion of the array of depth pixels as corresponding to a same object. The classifying may be based on a variety of factors, such as similar color values or depth values of neighboring lidar pixels being similar (e.g., within threshold in a local neighborhood). The one or more proximity criteria can include the subset of the depth pixels being classified as corresponding to the same object.

A set of the array of depth pixels can be identified for classifying a predetermined object. For instance, a certain part (e.g., a lower part) of the lidar image can be reserved for detecting a road surface.

For examples using color for classification, ambient light can be measured using color sensors to generate an array of color pixels. One or more of the color pixels can be correlated to each of the depth pixels. The one or more of the color pixels can used to classify depth pixels as corresponding to the same object, e.g., based on the colors being similar, which can be measured as a distance using colorimetry, as will be appreciated by one skilled in the art.

The array of color pixels can have a higher resolution than the array of depth pixels. In such an example, the method can further include generating additional depth values for virtual depth pixels that lie between the depth pixels of the array, thereby increasing a ranging resolution. The additional depth values can be generated using the color pixels. Further details of such upsampling are provided above.

D. Adjusting Color Pixels

Besides depth values, color values can also be adjusted. The adjustment values can be based on filter kernel, e.g., as described in section V or section VI.

Figure 20:
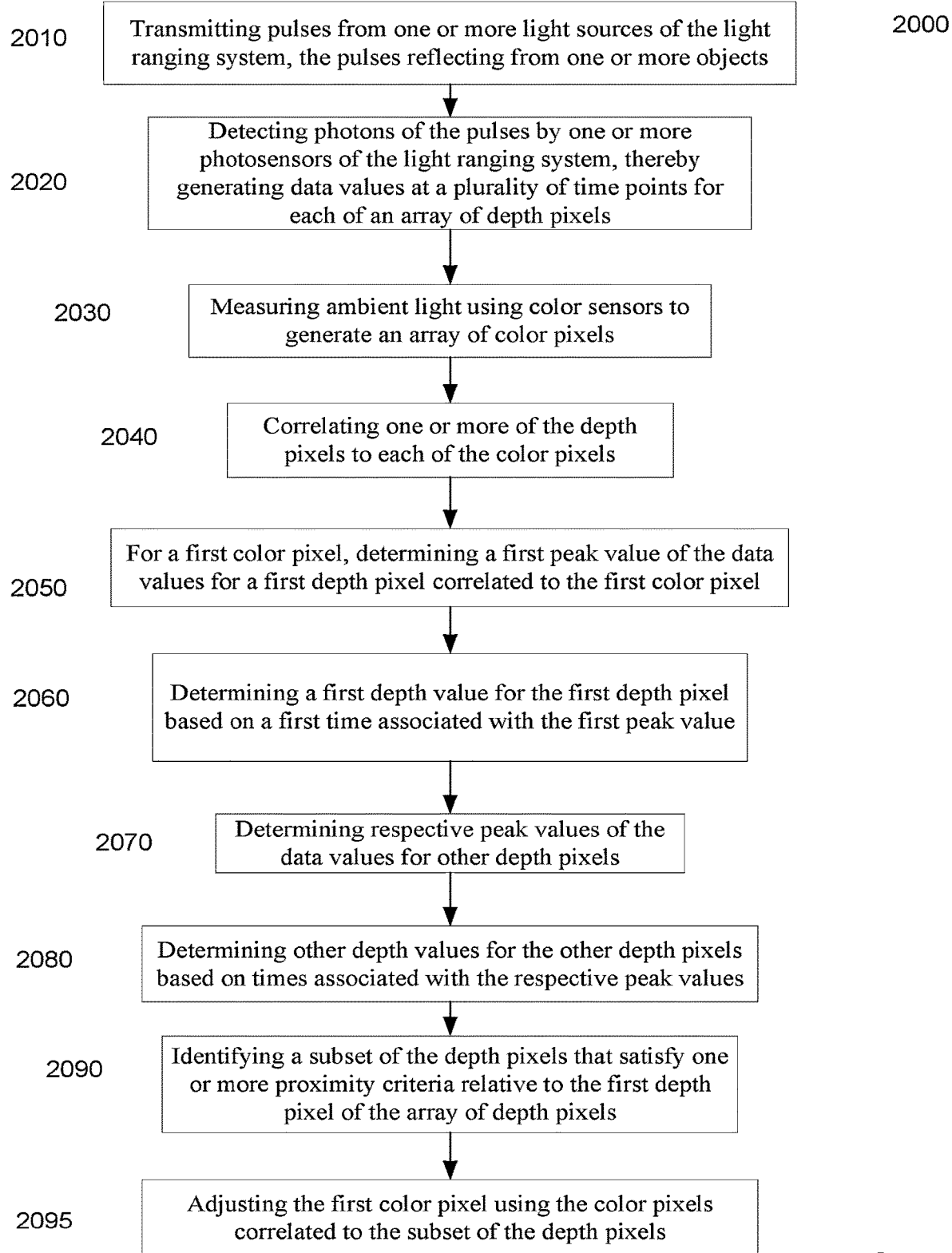
FIG. 20 is a flowchart illustrating a method for correcting color images according to embodiments of the present disclosure.

FIG. 20 is a flowchart illustrating a method 2000 for correcting color images according to embodiments of the present disclosure.

At block 2010, a transmission circuit transmits pulses from one or more light sources of the light ranging system. The pulses can reflect from one or more objects. Block 2010 can be performed in a similar manner as block 1810 and other detection disclosure herein.

At block 2020, photons of the pulses can be detected by one or more photosensors of the light ranging system, thereby generating data values at a plurality of time points for each of an array of depth pixels. Block 2020 can be performed in a similar manner as block 1820 and other detection disclosure herein.

At block 2030, ambient light is measured using color sensors to generate an array of color pixels. The color sensors can be on a same or different integrated circuit as the photosensors. For example, the color sensors can be in separate cameras or in a same sensor array, e.g., as shown in FIG. 10.

At block 2040, one or more of the depth pixels are correlated to each of the color pixels. The depth pixels can be correlated as described above, e.g., as described for FIG. 9 or 10.

At block 2050, for a first color pixel, a first peak value of the data values is determined for a first depth pixel correlated to the first color pixel. The determination of peak values can be performed as described herein, e.g., as described for block 1930.

At block 2060, a first depth value for the first depth pixel is determined based on a first time associated with the first peak value. The first depth values can be determined as described herein, e.g., as described for block 1940.

At block 2070, respective peak values of the data values are determined for other depth pixels. The respective peak values can be determined in a similar manner as the first depth value.

At block 2080, other depth values for the other depth pixels are determined based on times associated with the respective peak values. The respective peak values can be determined in a similar manner as the first depth value.

At block 2090, a subset of the depth pixels is identified that satisfy one or more proximity criteria relative to the first depth pixel of the array of depth pixels. Examples of the one or more proximity criteria are provided above, e.g., for methods 1800 and 1900 and in sections V and VI. The one or more proximity criteria can include a difference between the first depth value and one of the other depth values. As another example, a proximity criterion can be a classification of the subset of depth pixels being part of a same object.

At block 2095, the first color pixel is adjusted using the color pixels correlated to the subset of the depth pixels. Adjusting the first color pixel can include determining a weighted average of the color pixels correlated to the subset of the depth pixels. The weighted average may or may not include the first color pixel. The weights can be determined based on differences in the other depth values from the first depth value.

In some examples, adjusting the first color pixel can include discarding the first color pixel based on a difference between the first color pixel and the color pixels correlated to the subset of the depth pixels. For example, if the other colors are very different, then the first color pixel can be discarded as an error. In such a case, adjusting the first color pixel can includes determining a weighted average of the color pixels correlated to the subset of the depth pixels, wherein the weighted average does not include the first color

IX. Computer System

Figure 21:
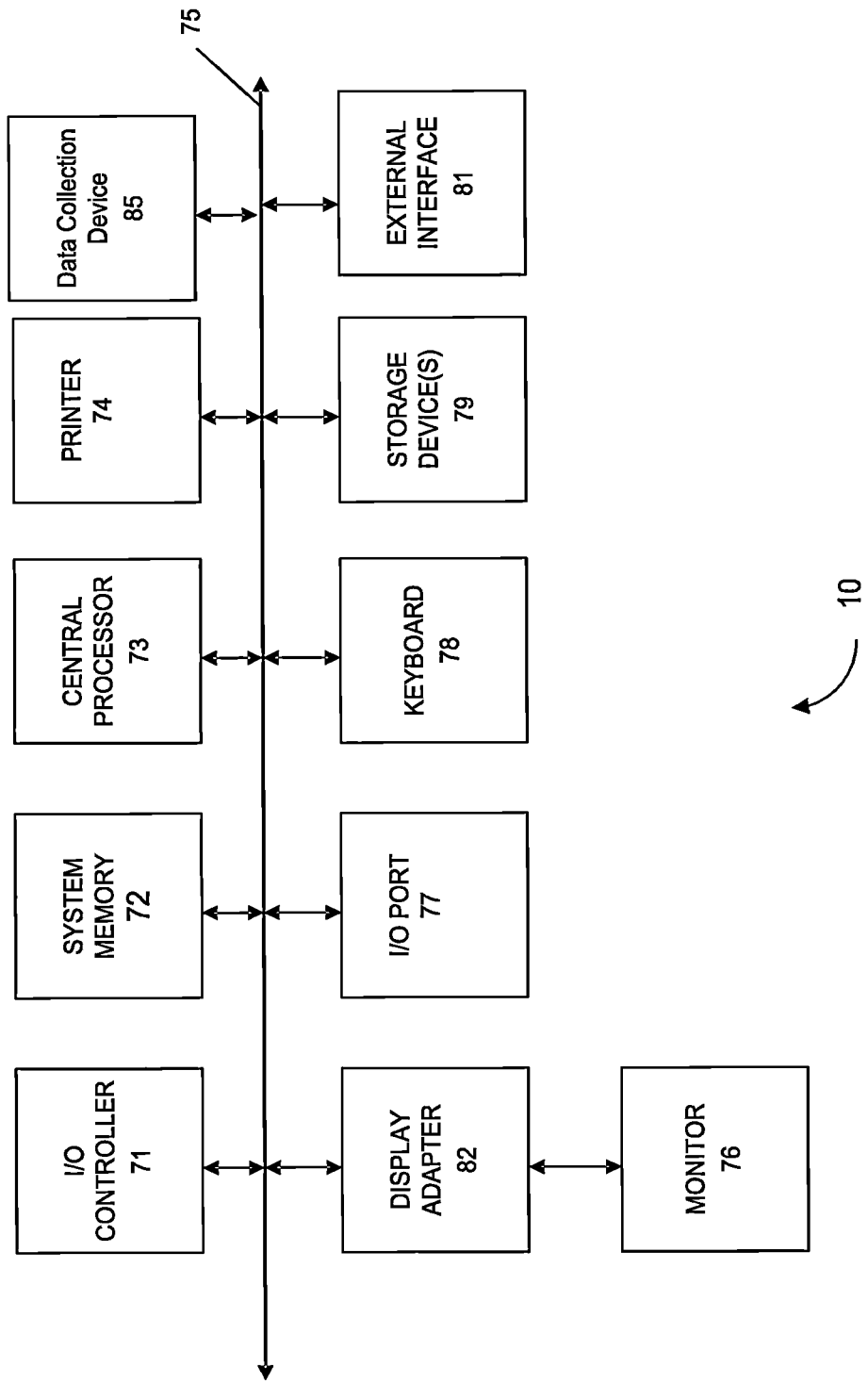
FIG. 21 shows a block diagram of an example computer system usable with systems and methods according to embodiments of the present invention.

Any of the computer systems (e.g., user interface 215 or vehicle control unit 217 of FIG. 2) or components of a lidar system mentioned herein may utilize any suitable number of subsystems. Examples of such subsystems are shown in FIG. 21 in computer system 10. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 21 are interconnected via a system bus 75. Additional subsystems such as a printer 74, keyboard 78, storage device(s) 79, monitor 76 (e.g., a display screen, such as an LED), which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of a plurality of instructions from system memory 72 or the storage device(s) 79 (e.g., a fixed disk, such as a hard drive, or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g. an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk) or Blu-ray disk, flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the present disclosure has been presented for the purposes of illustration and description. It is not intended to be exhaustive or to limit the disclosure to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

All patents, patent applications, publications, and descriptions mentioned herein are incorporated by reference in their entirety for all purposes. None is admitted to be prior art.

What is claimed is:

1. A system comprising:
   a kernel-based coprocessor; and
   a scanning light ranging device comprising:
      a transmission circuit comprising a plurality of light sources that emit light pulses;
      a detection circuit comprising:
         an array of photosensors that detect reflected light pulses and output signals measured over time; and
         a signal processor connected to the array of photosensors and configured to determine depth values from measurements using the array of photosensors; and
      an image reconstruction circuit communicably coupled with the detection circuit and configured to:
         assign a sensor ID to each of first depth values for a first scan of the scanning light ranging device;
         construct a first lidar image using the first depth values by:
            mapping, using the sensor IDs, the first depth values to first lidar pixels in the first lidar image, the first lidar image being a rectilinear image, wherein the mapping uses a mapping table that specifies a first lidar pixel based on a corresponding sensor ID; and
            store the first lidar pixels of the first lidar image in a local image buffer of the scanning light ranging device; and
         send the first lidar pixels of a local frame of the first lidar image or of a complete frame of the first lidar image to the kernel-based coprocessor.

2. The system of claim 1, wherein the scanning light ranging device rotates.

3. The system of claim 1, wherein the kernel-based coprocessor and the scanning light ranging device are on a same integrated circuit.

4. The system of claim 1, wherein the detection circuit is configured to provide the sensor ID for each of the first depth values to the image reconstruction circuit.

5. The system of claim 1, wherein the detection circuit is configured to provide the first depth values in a specified order, and wherein the image reconstruction circuit is configured to assign the sensor ID for a particular first depth value based on the specified order.

6. The system of claim 1, wherein a row of the mapping table includes a column for the sensor IDs and another column that specifies coordinates of the first lidar pixels in the first lidar image.

7. The system of claim 1, wherein the image reconstruction circuit is configured to determine when a specified subset of the first lidar pixels have been stored for the first lidar image and send the specified subset of the first lidar pixels to the kernel-based coprocessor.

8. The system of claim 1, wherein the kernel-based coprocessor includes a classifier circuit communicably coupled with the scanning light ranging device and configured to:
   receive lidar images, including the first lidar image, output by the image reconstruction circuit;
   analyze the depth values in the lidar pixels of the lidar images;
   correlate a set of lidar pixels based on corresponding depth values of the set of lidar pixels; and
   output classification information of the set of lidar pixels based on the correlating.

9. The system of claim 1, wherein the kernel-based coprocessor includes a depth imaging circuit communicably coupled with the scanning light ranging device and configured to:
   receive the first lidar pixels; and
   apply one or more filter kernels to subsets of the first lidar pixels to generate filtered images of lidar pixels.

10. A system comprising:
    a light ranging device comprising:
       a transmission circuit comprising a plurality of light sources that emit light pulses; and
       a detection circuit comprising:
          an array of photosensors that detect reflected light pulses and output signals measured over time; and
          a ranging circuit connected to the array of photosensors and configured to:
             determine depth values from measurements using the array of photosensors to form a lidar image comprising a grid of lidar pixels, wherein a lidar pixel includes a depth value, the grid of lidar pixels forming a rectilinear frame of an environment during a measurement interval, and
             periodically output lidar images, wherein each lidar image is generated during a different measurement interval and comprises rows and columns of lidar pixels;
    a classifier circuit communicably coupled with the light ranging device and configured to:
       receive the lidar images output by the ranging circuit;
       analyze the depth values in the lidar pixels of the lidar images;
       correlate a set of lidar pixels based on corresponding depth values of the set of lidar pixels; and
       output classification information of the set of lidar pixels based on the correlating.

11. The system of claim 10, wherein the set of lidar pixels include a first lidar pixel in a first lidar image that is correlated to a second lidar pixel in a second lidar image as corresponding to a same point of an object in the environment.

12. The system of claim 11, wherein the second lidar image is acquired after the first lidar image, and wherein the first lidar image is buffered while the second lidar image is acquired.

13. The system of claim 12, wherein the first lidar pixel is correlated to the second lidar pixel using differences in depth values between adjacent lidar pixels and/or differences in peak values between adjacent lidar pixels relative to the first lidar pixel and the second lidar pixel, respectively in the first lidar image and the second lidar image.

14. The system of claim 10, further comprising:
a coprocessor configured to:
receive a first frame of lidar pixels from the detection circuit;
identify a first set of key points in the first frame of lidar pixels using (1) differences in depth values between adjacent lidar pixels and/or (2) differences in peak values between adjacent lidar pixels;
store, in a first buffer, the first set of key points, including the differences used to identify the first set of key points;
receive a second frame of lidar pixels from the detection circuit;
identify a second set of key points in the second frame of lidar pixels using (3) differences in depth values between adjacent lidar pixels and/or (4) differences in peak values between adjacent lidar pixels;
correlate one or more of the first set of key points to one or more of the second set of key points using the differences;
compute velocities of key points using differences between correlated pairs of key points; and
output the velocities.

15. The system of claim 14, wherein the coprocessor is further configured to:
store, in the first buffer for the first set of key points, three-dimensional positions formed by lateral positions of the adjacent lidar pixels and corresponding depth values; and
correlate the one or more of the first set of key points to the one or more of the second set of key points further using the three-dimensional positions.

16. The system of claim 14, wherein the coprocessor is the classification circuit.

17. The system of claim 10, wherein the set of lidar pixels include a group of lidar pixels in a first lidar image that are identified as corresponding to a same object, and wherein the classification information indicates which lidar pixels of a lidar image correspond to the same object.

18. The system of claim 17, further comprising:
a depth imaging circuit communicably coupled with the light ranging device and the classifier circuit, the depth imaging circuit configured to:
receive the lidar pixels of the lidar images;
receive the classification information about groups of lidar pixels that correspond to the same object; and
apply one or more filter kernels to subsets of lidar pixels of the lidar images based on the classification information.

19. A system comprising:
a light ranging device comprising:
a transmission circuit comprising a plurality of light sources that emit light pulses;
a detection circuit comprising:
an array of photosensors that detect reflected light pulses and output signals measured over time;
a ranging circuit connected to the array of photosensors and configured to:
determine depth values from measurements using the array of photosensors to form a lidar image comprising a grid of lidar pixels, wherein a lidar pixel includes a depth value, the grid of lidar pixels forming a rectilinear frame of an environment during a measurement interval, and
periodically output lidar images, wherein each lidar image is generated during a different measurement interval and comprises rows and columns of lidar pixels; and
a depth imaging circuit communicably coupled with the light ranging device and configured to:
receive the lidar pixels of the lidar images; and
apply one or more filter kernels to subsets of lidar pixels of the lidar images to generate filtered images of lidar pixels.

20. The system of claim 19, wherein each of the array of photosensors have a sensor ID and the detection circuit further comprises a mapping table that specifies a lidar pixel based on a corresponding sensor ID, and wherein the ranging circuit is further configured to:
assign a sensor ID to each of the signals and corresponding depth values; and
construct the lidar image using the depth values by mapping, using the mapping table and sensor IDs, the depth values to the grid of lidar pixels in the lidar image.

21. The system of claim 19, wherein the one or more filter kernels includes a filter kernel that adjusts a peak value or a detection threshold of a signal for a given lidar pixel using signals of other lidar pixels neighboring the given lidar pixel.

22. The system of claim 19, wherein the one or more filter kernels includes a filter kernel that adjusts a depth value for a given lidar pixel using signals of other lidar pixels neighboring the given lidar pixel.

23. The system of claim 19, wherein the detection circuit further comprises color sensors that detect ambient light to generate an array of color pixels, and wherein the depth imaging circuit is further configured to correlate one or more of the lidar pixels to each of the array of color pixels, and
wherein the one or more filter kernels includes a filter kernel that adjusts a color value for a given color pixel using color pixels correlated to other lidar pixels neighboring the given color pixel, wherein the other lidar pixels satisfy one or more proximity criteria including a difference between a first depth value correlated to the given color pixel and other depth values of the other lidar pixels.

24. A method of performing ranging using a light ranging system installed on a mobile apparatus, the method comprising:
transmitting, using a transmission circuit, pulses from one or more light sources of the light ranging system, the pulses reflecting from one or more objects;
for each of an array of photosensors, measuring a signal by detecting photons of the pulses using a detection circuit;
assigning a sensor ID to each of the signals, the sensor ID corresponding to one of the array of photosensors;
analyzing the signals to determine first depth values;
constructing a first lidar image using the first depth values by:
mapping, using the sensor IDs, the first depth values to first lidar pixels in the first lidar image, the first lidar image being a rectilinear image, wherein the mapping uses a mapping table that specifies a lidar pixel based on a corresponding sensor ID; and
storing the first lidar pixels of the first lidar image in a image buffer of the light ranging system; and sending the first lidar pixels of a local frame of the first lidar image or of a complete frame of the first lidar image to a kernel-based coprocessor of the light ranging system.

25. The method of claim 24, wherein the sensor ID is received from the detection circuit with the signal.

26. The method of claim 24, wherein the sensor IDs are assigned based on a specified order in which the signals are provided by the detection circuit.

27. The method of claim 24, wherein the sensor IDs are assigned to each of the signals by assigning the sensor IDs to the first depth values, and wherein the sensor IDs are assigned based on a specified order in which the first depth values are provided to an image reconstruction circuit.

28. The method of claim 24, further comprising:
constructing a second lidar image using second depth values;
storing the second lidar image in the image buffer; and
adjusting one or more values of the first lidar image based on an analysis of the first lidar image and the second lidar image, thereby obtaining one or more adjusted values.

29. The method of claim 28, wherein the one or more adjusted values include color values of the first lidar image.

30. The method of claim 24, further comprising:
applying a filter kernel to a portion of the first lidar image, wherein the filter kernel is applied before the first lidar image is completely constructed.

31. The method of claim 24, wherein the mapping table specifies a lidar pixel based on the corresponding sensor ID and a position of the light ranging system when the signal is measured.

* * * * *